United States Patent [19]

Ogino et al.

[11] Patent Number: 5,301,021
[45] Date of Patent: Apr. 5, 1994

[54] DISPLAY WITH VERTICAL SCANNING FORMAT TRANSFORMATION

[75] Inventors: Masanori Ogino, Yokohama; Tadashi Fukushima, Hitachi; Takeo Yamada, Yokohama; Shigeyuki Shiotani, Fujisawa, all of Japan

[73] Assignee: Hitachi, Ltd., Tokyo, Japan

[21] Appl. No.: 907,245

[22] Filed: Jul. 1, 1992

[30] Foreign Application Priority Data

Jul. 1, 1991 [JP] Japan .................. 3-185858

[51] Int. Cl.$^5$ .............................................. H04N 5/00
[52] U.S. Cl. ........................................ 348/564; 348/441
[58] Field of Search ............. 358/160, 180, 183, 22, 358/29, 140, 12; 340/717; H04N 5/00

[56] References Cited

U.S. PATENT DOCUMENTS

| | | | |
|---|---|---|---|
| 4,635,105 | 1/1987 | Favreau | 358/230 X |
| 4,701,788 | 10/1987 | Desjardins | 358/29 X |
| 4,746,981 | 5/1988 | Nadan et al. | 358/160 |
| 4,825,201 | 4/1989 | Watanabe et al. | 340/717 |
| 4,999,710 | 3/1991 | Senso et al. | 358/160 |
| 5,166,801 | 11/1992 | Yoshikawa | 358/22 X |

FOREIGN PATENT DOCUMENTS

2-113295  4/1990  Japan .................. 358/140

*Primary Examiner*—Mark R. Powell
*Attorney, Agent, or Firm*—Antonelli, Terry, Stout & Kraus

[57] ABSTRACT

Apparatus for a multi-screen display including a multiprocessor for processing signals from at least one signal source and for applying processed signals to a plurality of display units arranged in at least two rows so as to form the multi-screen display. The multiprocessor includes vertical scanning format transformation apparatus for transforming a vertical scanning frequency of the output signal of the multiprocessor to be a higher vertical scanning frequency than that of a vertical scanning frequency of the input signal of the multiprocessor so that a ratio of the vertical scanning frequency of the output signal applied to the multi-screen display to the vertical scanning frequency of the input signal is at least two, thereby substantially eliminating discontinuity distortion of a moving pole image displayed as a reproduced picture on the multi-screen display.

16 Claims, 22 Drawing Sheets

DISPLAY WITH VERTICAL SCANNING FORMAT TRANSFORMATION

BACKGROUND OF THE INVENTION

The present invention relates to a multi-screen display system wherein a plurality of projector units are distributed in a matrix arrangement.

FIG. 2 shows a general arrangement for a multi-screen display system wherein a signal source 1 supplies a signal to a multiprocessor 2 which provides respective output signals to a multi-screen display 3. The multi-screen display includes two columns and two rows wherein 1-1, 1-2, ... etc. are the display units of the first row and the first column, the first row and the second column, ... etc. respectively, and correspond to output signals $D_{1-1}$, $D_{1-2}$, ... from the multiprocessor. FIG. 3 shows the construction of a display unit including a CRT 4 for projection, a lens 5 for projection, and a screen 6.

FIG. 4 is a block diagram arrangement of a conventional multiprocessor 2 wherein $VD_i$, $HD_i$ and $D_i$ represent an input vertical synchronous signal, an input horizontal synchronous signal and an input picture signal, respectively. There is provided a phase detector 7, a voltage control oscillator 8 (hereinafter abbreviated as "VCO"), and a programmable counter 9 for generating a horizontal address (X) which form a well-known PLL (Phase Lock Loop). As an example, the vertical/horizontal scanning frequency of the input signal is approximately 60 Hz/32 KHz, the number of total scanning lines is approximately 500 lines, and the oscillation frequency for the VCO is approximately 30 MHz. A programmable counter 10 serves for generating a vertical address (Y) and counts the number of output horizontal synchronous pulses ($HD_0$) and is reset by the vertical synchronous signal $VD_i$. An AD converter 11 is coupled to an SP converter for converting serial signals into parallel signals. There is also provided a frame memory 13 wherein $M_{1-1}$ is a memory for the first row of the first column, $M_{1-2}$ is a memory for the first row of the second column, $M_{2-1}$ is a memory for the second row of the first columns and $M_{2-2}$ is a memory for the second row of the second column, each being composed of a first memory and a second memory. A line memory 14 is coupled to the frame memory.

FIGS. 5A and 5B show the principle of the operation of the multiprocessor of FIG. 4 wherein a timing chart 15 is shown in FIG. 5A and the abscissa t indicates time marked in a frame unit while the ordinate indicates a memory address. $M_{1-1, 1}$ is the first memory for the first row and the first column, $M_{2-1, 1}$ is the first memory for the second row and the first column, $M_{1-1, 2}$ is the second memory for the first row and the first column, and $M_{2-1, 2}$ is the second memory for the second row and the first column, and correspond to the frame memory 13 in FIG. 4. Memories corresponding to the second column are omitted in FIG. 5A. In the figure, for example, W3 indicates that picture signals of the frame 3 are written into the memory. R3 indicates that picture signals of the frame 3 are read out from the memory. Output signals being read out pass through the line memory 14 in FIG. 4, and are outputted as $D_{1-1}$, $D_{2-1}$, and are supplied to the multi screen display 3 in FIG. 2. In the prior art, vertical/horizontal scanning frequencies of the multi screen display 3 are approximately 60 Hz/32 kHz like those of the input signals. The total number of the scanning lines for the input signals is approximately 500 and are divided into 250 lines for the upper stage (for the first row) and 250 lines for the lower stage (for the second row) and are written into frame memories $M_{1-*}$ and $M_{2-*}$, respectively, and are read out concurrently at the timing indicated in FIG. 5A. The line memory 14 is used for outputting picture signals corresponding to the same scanning line two times repeatedly.

In the prior art, however, there is a defect that discontinuity interference and inclination distortion of moving pole images take place as indicated in 16 of FIG. 5B wherein the moving pole image is a vertically extending image moving horizontally across the rows of the display screen. In FIG. 5B, a rectangular frame 16-1 is a frame for the whole screen. A discontinuous slanting line 16-2 is a vertical moving pole image. That is, although the original vertical pole is to be moved at the speed v to the right side, a distorted pole is seen as indicated in 16-2 in the figure for the first and second rows. This phenomenon is explained quantitatively below. Making the discontinuity width $\Delta x$, this is equal to approximately $v\Delta t$, where $\Delta t$ is a time difference described as indicated in FIG. 5A, and is equal to vertical scanning period of approximately 15 ms. Accordingly, in the case of a body moving at approximately 15 mm/15 ms (1 m/s), the discontinuity of approximately 15 mm has been produced at the link or boundary of the upper/lower rows of the screen (This is referred to as a discontinuity interference). Moreover, in FIG. 5A, since the speed in writing the picture signals into the memory (gradient of the solid lines indicating the writing-in speed) is different from the speed in reading out the signals from the memory (gradient of the dotted lines indicating the reading-out speed), the moving pole which is originally vertical is inclined by an angle $\theta = \Delta x/H$ (where H is a height of screen) (this is denominated as inclination distortion).

FIG. 6A shows a timing chart 17 and FIG. 6B shows a moving pole distortion 18 in the case of four rows and four columns in accordance with the prior art.

FIG. 7 shows a timing chart 19 for an improved example according to the prior art as described in Japanese Patent Application Laid-Open No. 3-114373 having a laid-open date of May 15, 1991, and FIG. 7B shows a moving pole distortion 20 in the case for four rows and four columns wherein four sets of the frame memories 13 in FIG. 4 are used. As is apparent from FIG. 7B, the discontinuity interference at the links of the rows of screens is eliminated, but there is a problem that the inclination distortion remains. Moreover, there is also a problem that many sets of frame memories are required.

SUMMARY OF THE INVENTION

An object of the present invention is to provide a multi screen display system for eliminating the discontinuity interference of moving pole images and the inclination distortion thereof.

Another object of the present invention is to provide a multi-screen display system enabling minimization of the number of required memory elements.

Another object of the present invention is to provide a multi-screen display system enabling improvement of a luminous efficiency of a fluorescent material for projecting CRTs.

A further object of the present invention is to provide a multi-screen display system for compensating for non-linearity of the luminous efficiency of a fluorescent material for projecting CRTs.

Another object of the present invention is to provide a multi-screen display system enabling utilization of a high precision computer with low frame frequency as a signal source.

A further object of the present invention is to provide a multi-screen system enabling a multi-scanning function using a liquid crystal panel for the display unit.

In accordance with the present invention, a multi-screen display system is provided with a multiprocessor having a vertical scanning format transformation apparatus so that a vertical scanning frequency of an output signal for each display unit is made higher than that of a signal source.

Also in accordance with the multi-screen display system of the present invention, there is provided a beam spot size adjusting apparatus or non-linearity adjusting apparatus.

The vertical scanning format transformation apparatus according to the present invention transforms vertical scanning frequencies of an output signal to n times of those input signal (n>1). Each display unit displays identical pictures having n fields in the period of one frame of the signal source. Thereby indication timings upper/lower boundaries of each unit screen are nearly coincident. Accordingly, discontinuity of boundaries for moving pole images is eliminated. Further, as the vertical scanning time from the upper end to the lower end of the whole screen is equal to one frame time input (signal per one field (1/n frame×n rows=1), the inclination distortion for the moving pole images is eliminated.

Further, according to the present invention the beam spot size adjusting apparatus adjusts the beam spot size of the CRT for the multi-screen display according to whether the number of scanning lines is dense or coarse, and the effective spot size at least in the longitudinal direction is made nearly coincident with the scanning line intervals. Thus, the improvement of the utilization efficiency of the fluorescent material is obtained.

Additionally, a non-linearity adjusting apparatus is provided and enables correcting of variations of the non-linearity of luminous efficiency for the fluorescent materials depending on the vertical scanning period and the spot size.

These and further objects, features and advantages of the present invention will become more obvious from the following description when taken in connection with the accompanying drawings which show for purposes of illustration only, several embodiments in accordance with the present invention.

DESCRIPTION OF THE PREFERRED EMBODIMENTS

Figure 1:
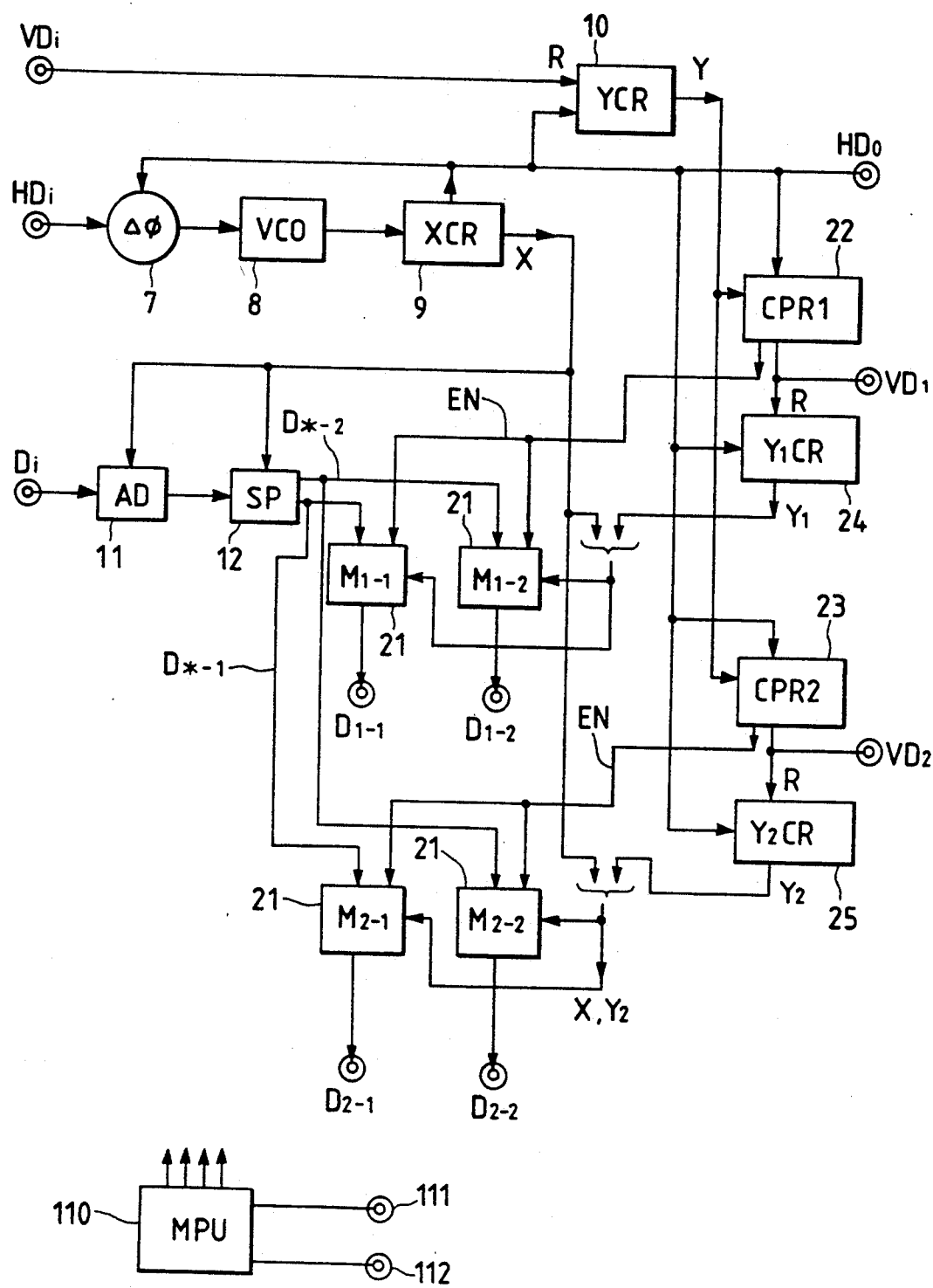
FIG. 1 shows a block diagram of an embodiment of the present invention.
Figure 2:
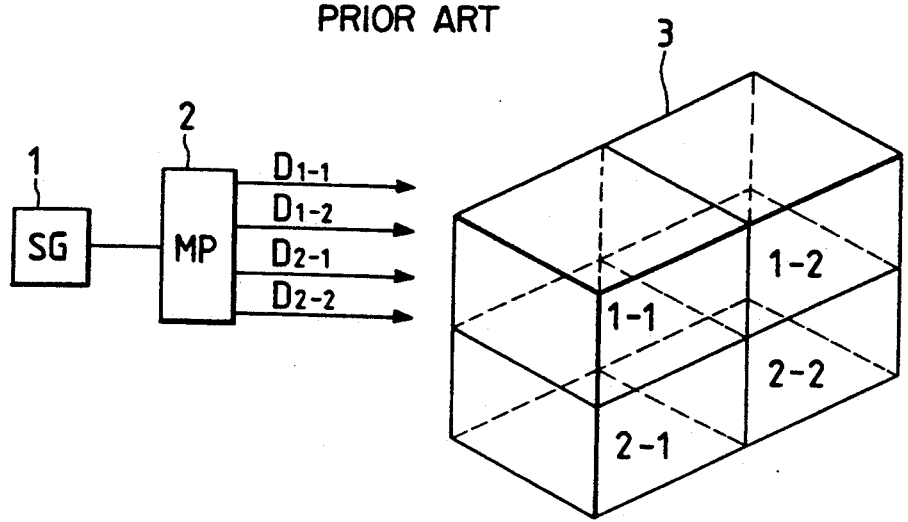
FIG. 2 shows a general arrangement of a multi-screen display system.

An embodiment of a microprocessor portion 2 of the present invention is shown in FIG. 1 wherein the microprocessor 2 is used with a signal source 1 and a multi-screen display 3 as shown in FIG. 2. Moreover, a well known multi-scan type display is used for the multi screen display 3 which can follow wide range of horizontal/vertical scanning frequencies, and can affect control of the horizontal/vertical, position/size in accordance with external control signals. The reference numerals in FIG. 1 are utilized to designate like elements to those described previously in connection with FIG. 4. Further, there is provided a frame memory 21, and $M_{1-1}$, $M_{1-2}$ are memories for the first row, and $M_{2-1}$, $M_{2-2}$ are memories for the second row. $D_{1-1}$, $D_{1-2}$ are picture signal outputs for the first row, and $D_{2-1}$, $D_{2-2}$ are picture signal outputs for the second row. A programmable comparator 22 is provided for the first row, and a programmable comparator 23 is provided for the second row, and provide respective outputs $VD_1$, $VD_2$ which are vertical synchronous signal outputs for the first and second rows, respectively. Programmable counters 24, 25 are provided for generating vertical address signals $Y_1$, $Y_2$ for the first and second rows. A microprocessor portion 110 hereinafter abbreviated as "MPU") provides a signal output 111 for setting vertical position and size, and a signal output 112 for setting horizontal position and size, and these signals are transmitted to the succeeding multi-scan type display as already described, respectively. The MPU 110 also provides signals for controlling each programmable part of elements 9, 10, 21, 22, 23 and 24, but these are omitted in FIG. 1 for the simplification of the illustration.

Figure 8A:
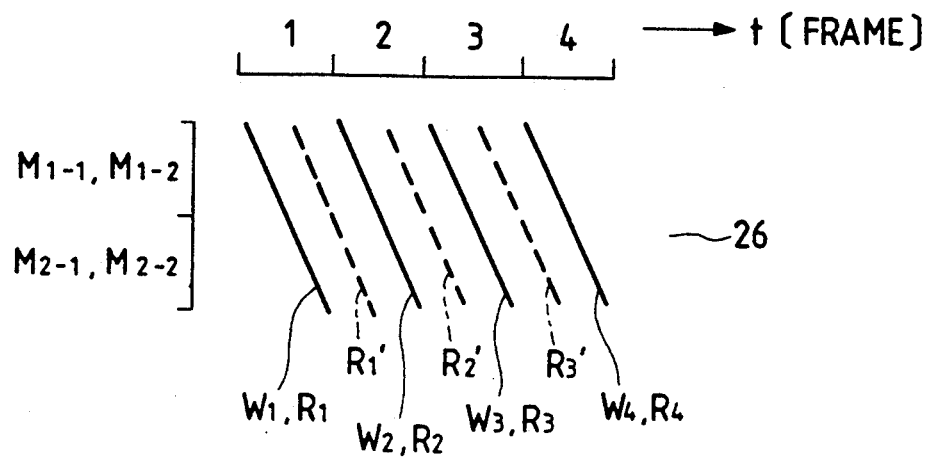
FIGS. 8A and 8B show a timing chart and moving pole image for explaining the operation principle in accordance with the embodiment of FIG. 1 utilizing two rows of display units.
Figure 8B:
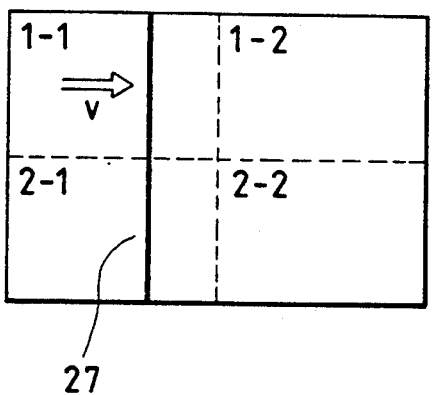

The operation of the embodiment of FIG. 1 will be described with reference to FIGS. 8A and 8B where FIG. 8A shows a timing chart 26 having an abscissa for time in a frame unit, and an ordinate representing address coordinates of the frame memory 21 in FIG. 1. $M_{1-1}$, $M_{1-2}$ are memories for the first row, and $M_{2-1}$, $M_{2-2}$ are memories for the second row. In FIG. 8A, for example, $W_1$ indicates that the frame 1 of the input signal is sequentially written into each address of the frame memory 21. $R_1$ indicates that the frame 1 of the input signal is outputted to the output terminal ($D_{i-j}$ in FIG. 1) at the same time of $W_1$. $R_{1'}$ indicates that the signal of the frame 1 is outputted from the frame memory. $W_2$ indicates that the frame 2 of the input signal is written into the frame memory 21. Moreover, $W_1$, $R_{2'}$ and $W_2$ are at approximately equal intervals on the time axis. Accordingly, in this case, the horizontal scanning period of each output picture signal $D_{i-j}$ conforms with that of the input signal in a manner similar to the prior art operation, while the vertical scanning period becomes approximately one half of the input signal. That is, the vertical scanning frequency becomes approximately twice that of the input signal. Therefore, the vertical synchronous signals $VD_1$, $VD_2$ having doubled frequencies are outputted from the comparators 22, 23 as will be more fully described hereafter. Generally, in the case of the multi-screen system being composed of n rows, vertical synchronous signals having frequencies of nearly n times are outputted.

Figure 5A:
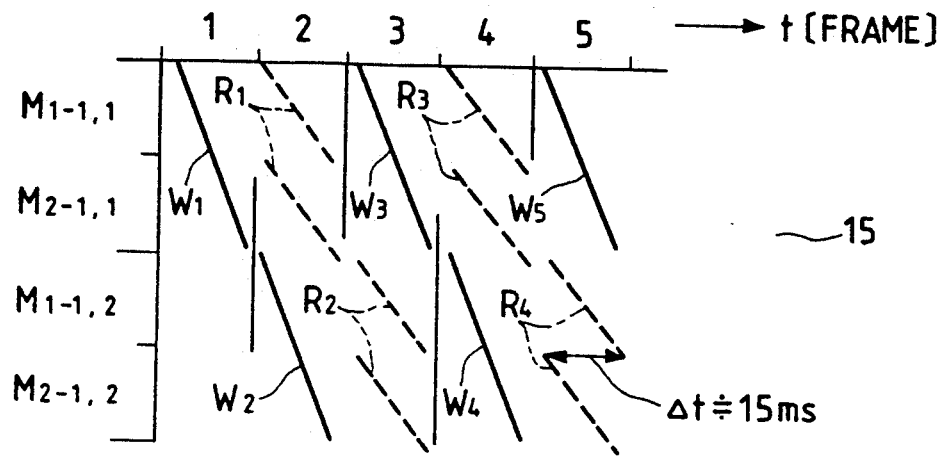
FIGS. 5A and 5B show a timing chart and moving pole image for explaining the operation principle in FIG. 4.
Figure 5B:
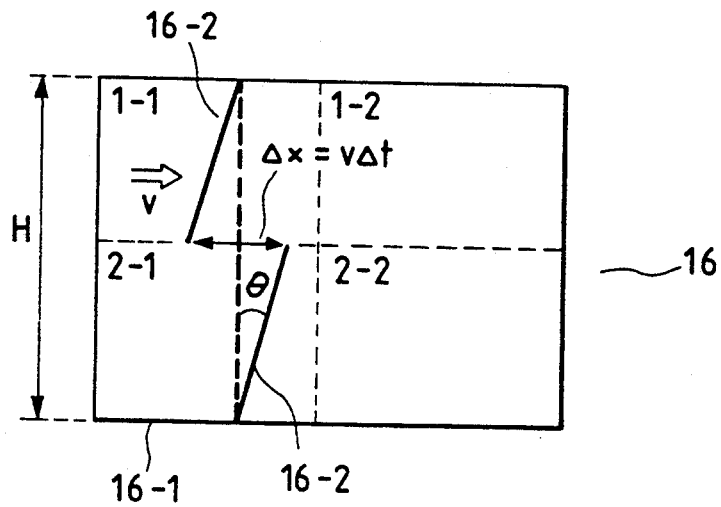
Figure 6A:
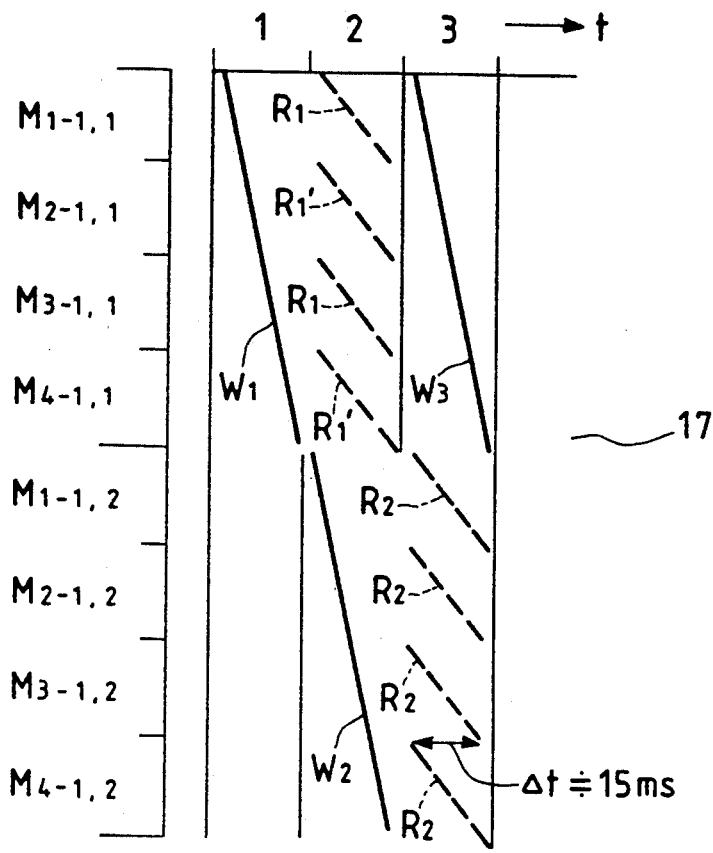
FIGS. 6A and 6B show a timing chart and moving pole image for explaining the operation principle in another conventional arrangement.
Figure 6B:
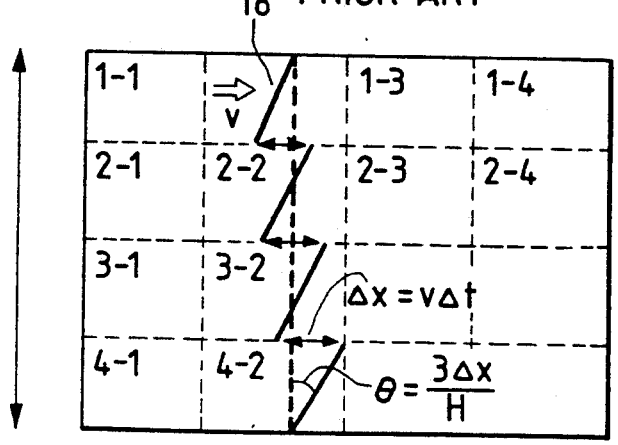
Figure 7A:
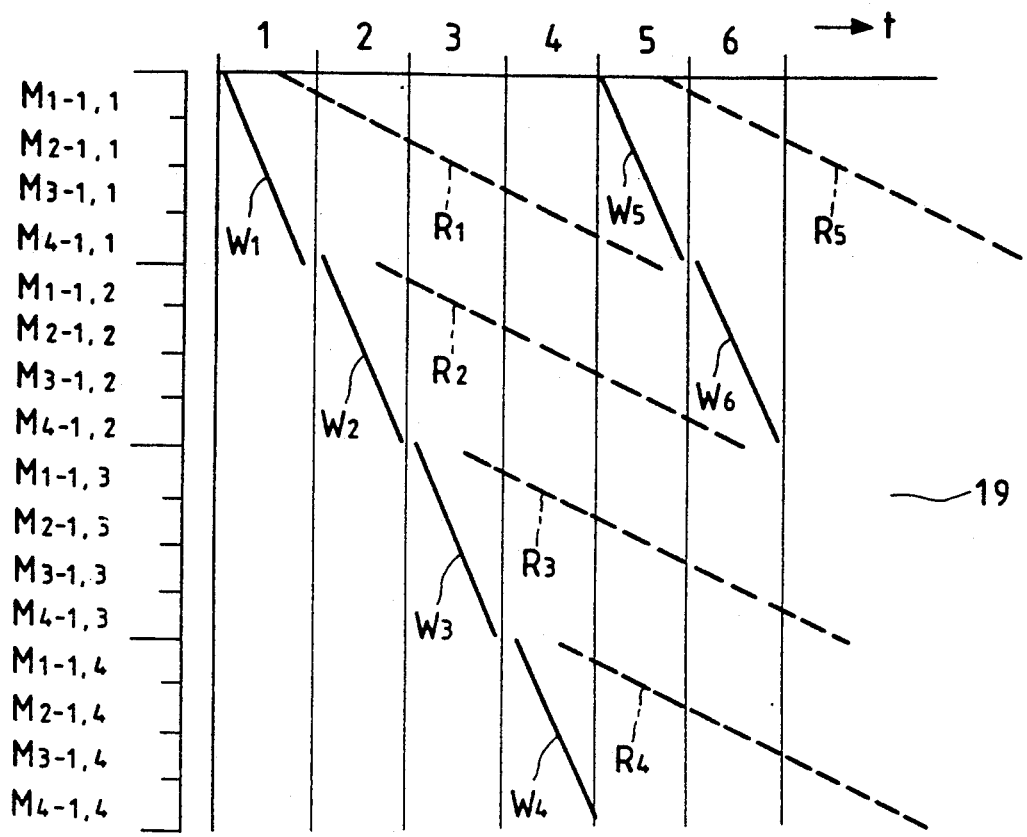
FIGS. 7A and 7B show a timing chart and moving pole image for explaining the operation principle in further conventional arrangement.
Figure 7B:
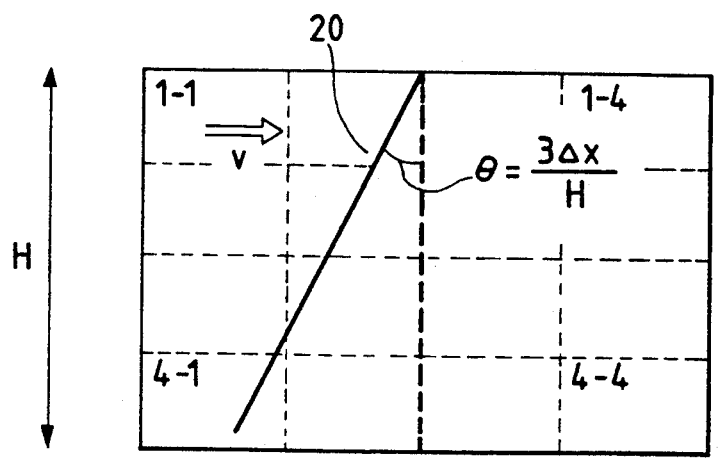

In the timing chart 26 of FIG. 8A, the timing deviation $\Delta t$ for the boundary part as illustrated in FIG. 5 is eliminated. Consequently, the discontinuity interference of the moving pole image is not generated. Further, in the timing chart 26, the gradient of the solid lines representing the write-in speed and the gradient of the dotted lines representing the read-out speed are the same. Accordingly, the moving pole image cannot generate the inclination distortion. Therefore, as shown in 27 of FIG. 8B, moving pole images without discontinuity and inclination distortion are reproduced on the multi-screen display with high fidelity.

Figure 9A:
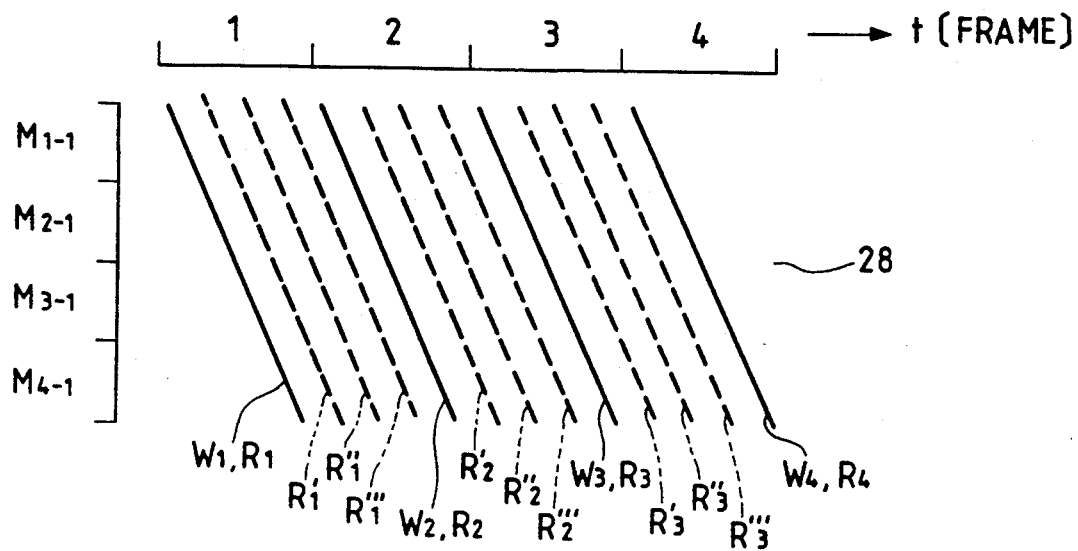
FIGS. 9A and 9B show a timing chart and moving pole image for explaining the operation principle when the embodiment of FIG. 1 is applied to a multi-screen arrangement of four rows.
Figure 9B:
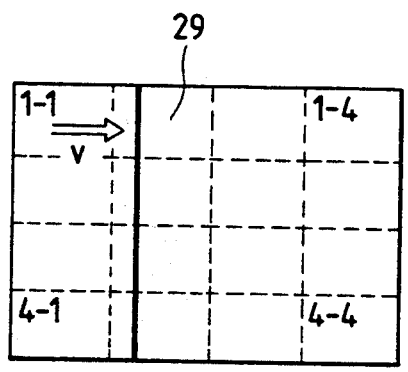

FIGS. 9A and 9B show an example where the present invention is applied to a multi-screen arrangement constituted in four rows wherein FIG. 9A shows a timing chart 28 and FIG. 9B shows at 29 the reproduced pole image on the multi-screen display. In FIG. 9A, $W_1$ is a writing output for the frame 1, $R_1$ is a direct output, and $R_{1'}$, $R_{1''}$, $R'''$ are reading outputs.

The operation of the comparators 22, 23 and the counters 24, 25 for generating vertical addresses ($Y_1$, $Y_2$) in FIG. 1 will now be explained. The output address signals $Y_1$, $Y_2$ are expressed as functions of the input address signal Y and the beginning timings of the output vertical synchronous signals $VD_1$, $VD_2$ are regulated as functions of the input address signal Y. The input vertical address signal Y indicates the numbers of the scanning lines being counted, the beginning point of the input vertical synchronous signals being the origin. That is, it can be considered as vertical co-ordinates of the input signals. Generally, n an being integer of not less than 2, indicating the sum of numbers of rows, the vertical address signal $Y_k$ for writing the k-th row is defined as function of Y by following equation.

$$\left.\begin{aligned}Y_k &= Y + b - B - (k - 1) S_{OP} \\ b &\geq T_{TB}/R_{DH} \\ T_{DH}&: \text{vertical blanking period of the display} \\ T_{DH}&: \text{Horizontal period of the output picture signal}\end{aligned}\right\} \quad (1)$$

In the above equation, $T_{DB}$ is a vertical blanking period of a succeed display, $T_{DH}$ is a horizontal period of output picture signals, b is the number of scanning lines or the number a little larger than that within the vertical blanking period of the succeeding display (non-indication scanning lines), and $S_{OP}$ is the number of effective scanning lines per row (indication scanning lines). B is the (order) number of input scanning lines corresponding to the upper end of the whole screen. At the time of writing into the frame memory 21, when the value of $Y_k$ becomes zero, the vertical synchronous signal $VD_k$ corresponding to the k-th row is triggered. That is, the values of Y indicated in the following equation (2) are previously stored in the programmable comparators 22 and 23 by the MPU 110, and according to the comparison results, $VD_k$ is generated.

$$\left.\begin{aligned}Y_k(VD_k) &= 0 \\ Y(VD_k) &= B - b + (k-1) S_{OP}\end{aligned}\right\} \quad (2)$$

Next, the relationship between Y and $Y_k$ or $VD_k$ during the k-th reading from the frame memory 21 is shown in the following equations (3) and (4). Regarding the k-th reading, for example, in FIGS. 8A and 9A, R' is the first reading, and in FIG. 9A, R", R'" are the second reading and the third reading, respectively.

$$Y_k = Y + b - B - (k - 1) S_{OP} - [h/n\, S_I] \quad (3)$$

$$\text{mod } (S_I)$$

$$Y(VD_k) = B - b + (k - 1) S_{OP} + h/n\, S_I \quad (4)$$

$$Y(VD_k) = B - b + (k - 1) S_{OP} + [h/n\, S_I] \quad (5)$$

In equations (3) and (4), $S_I$ is the number of total scanning lines for input signals. If $hS_I$ cannot be divided by the number n of the lines, it is sufficient to supplement terms below the decimal point with the horizontal address X (input X to comparators 22 and 23 in FIG. 1). Then, the succeeding CRT projecting type display carries out a so-called interlace operation. In equation (3), as $Y_k$ is the vertical address for the k-th row, it is an integer. That value is between 0 and $S_I/n$. In equation (3), the symbol [ ] indicates an integer being close to the number within [ ]. This can be a Gauss symbol omitting fractions below the decimal point, or can be a type of rounding off the fractions or a type of counting the fractions below the decimal point as one. Further in equations (3) and (4), as the input address Y is a periodic function having the number $S_I$ of the total scanning lines of input signals as a period, the value of Y is calculated using $S_I$ as a modulus. Equation (4) may be replaced by equation (5). In this case, in FIG. 1, an input horizontal address X to the programmable comparators 22 and 23 becomes unnecessary. Also in this case, a succeeding display carries out a so-called interlace operation.

As is understood from the above explanation, in FIG. 1, the programmable counters 22 and 23 generate $VD_k$ according to equation (2) and equation (4) or equation (5), and at the same time, the programmable counters 24 and 25 are reset. The programmable counters 24 and 25 count horizontal pulses ($HD_0$), and as a result, the outputted $Y_k$ automatically satisfies equations (1) nd (3). Moreover, in FIG. 1, the programmable comparators 22 and 23 enable the writing into the frame memory 21 when the values of $Y_k$ of equation (1) are in the period from 0 to $S_I$.

Next, an embodiment corresponding to the case defining the meaning of [ ] as an integer counting fractions below the decimal point as one in equations (3), (5) is described with reference to FIG. 10 wherein the primary portions are illustrated, and corresponds to the case that k=1.

Figure 10:
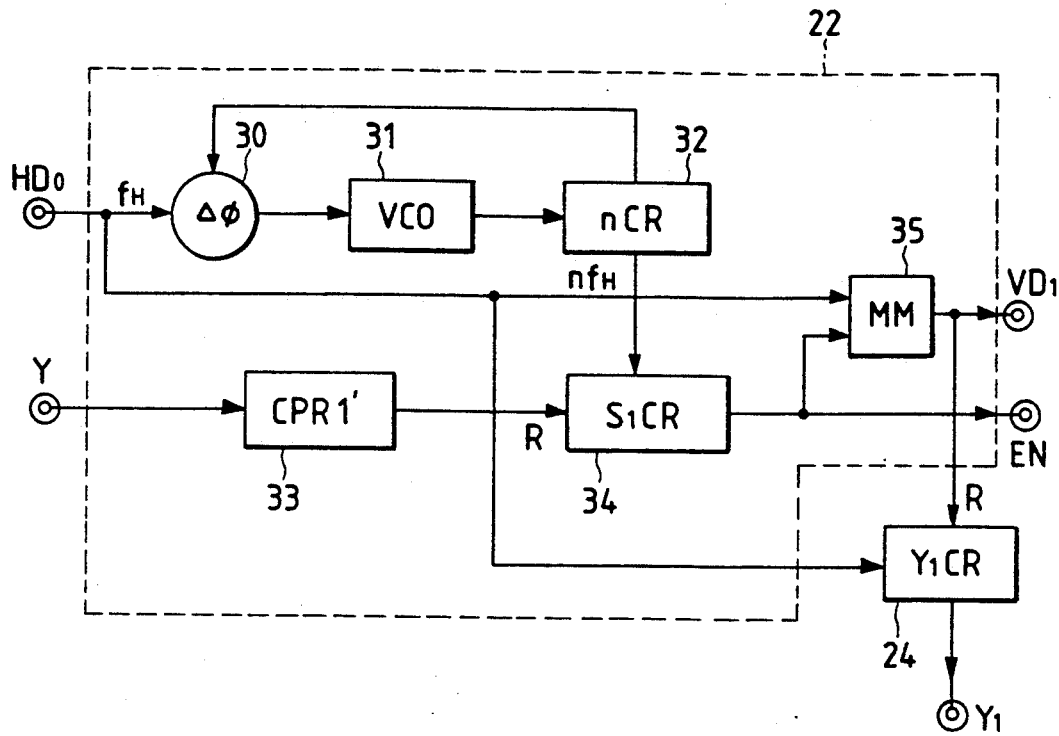
FIG. 10 is a block diagram showing elements of another embodiment of the present invention.

In FIG. 10, elements 22 and 24 correspond to elements 22 and 24 in FIG. 1. Elements 30, 31 and 32 form a PLL, and its inputs are horizontal pulses having frequency $f_H$ and its outputs are horizontal pulses having frequency of $nf_H$, where n is the number of lines for the multi-screen display. Element 32 is a programmable counter having the count number n. A programmable comparator 33 outputs pulses based on equation (2), and resets a succeeding programmable counter 34. The programmable counter 34 counts the total number $S_I$ of scanning lines of input signals, and outputs the ENABLE pulses per each count $S_I$ and provides them to a monostable multivibrator 35. which is triggered by the first horizontal pulse after receiving the ENABLE pulses, and generates vertical synchronous pulses $VD_1$. The programmable counter 24 is reset by the pulses $VD_1$. Hereafter, the programmable counter 24 continues to count the input horizontal pulses, and generates an output $Y_I$ conforming with equations (1) and (3). The output $Y_I$ is used as address $Y_I$ to the frame memory 21 in FIG. 1. The pulse $VD_1$ is supplied as a vertical synchronous signal to the successive display for the first row. Since the frequency of the output pulses of the programmable counter 32 is $nf_h$, the repeated frequency of the output pulses of the counter 24 of $S_I$ becomes $nf_v$, (where $f_v$ is the vertical frequency of the input signal). Accordingly, its effects are as indicated in 27 of FIG. 8B and 29 of FIG. 9B.

As to the selection of values of B in equations (1)–(5), the values of B are the number of scanning lines corresponding to the upper end on the multi-screen display, and its origin is the beginning point of the input vertical synchronous signals $VD_i$. As already described, since the number of effective scanning lines per one row is $S_{OP}$, the sum in n lines becomes $nS_{OP}$. Consequently, the number of scanning lines corresponding to the lower end is $B+nS_{OP}$. On the other hand, since the vertical blanking period of the succeeding CRT projecting type display is a finite value, the number b of scanning lines (refer to equation (1)) corresponding to this is also finite. If the number nb of blanking lines in the sum of n lines is less than the number $S_{IB}$ of blanking lines of input signals, no problem occurs. In the reverse case, however, a part of the input picture signals ($nb - S_{IB}$) is omitted. Accordingly, if the value of B is set equal to $S_{IB}$, the upper end of the picture surface is normal, and a part of the lower end of the picture surface is omitted. On the contrary, if the value of B is set equal to nb, the lower end of the picture surface is normal, and a part of the upper end of the picture surface is omitted. If the value of B is set between SIB and nb, the equal quantity is omitted in the upper/lower ends of the picture surface.

Figure 4:
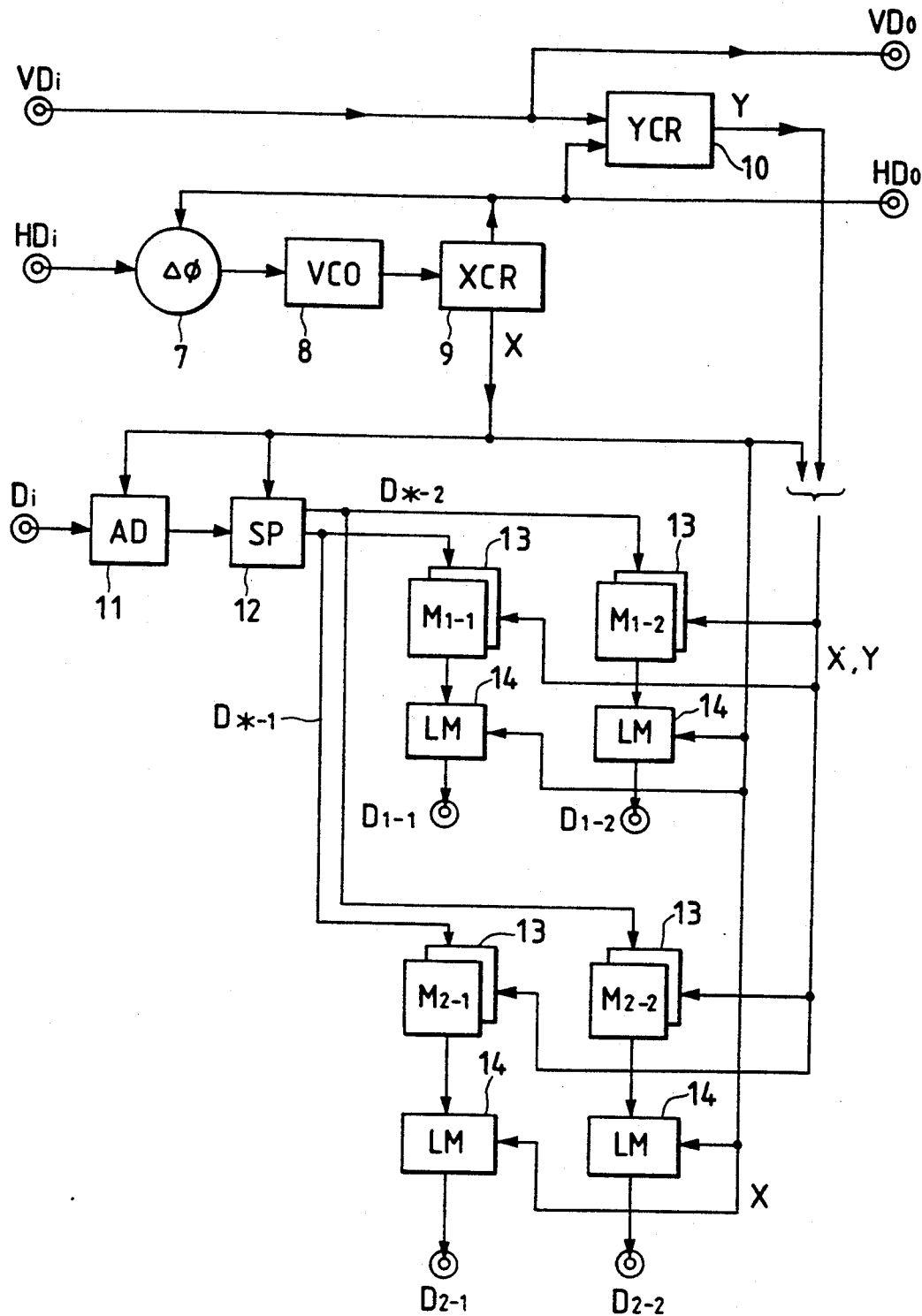
FIG. 4 is a block diagram showing a conventional multiprocessor.
Figure 11:
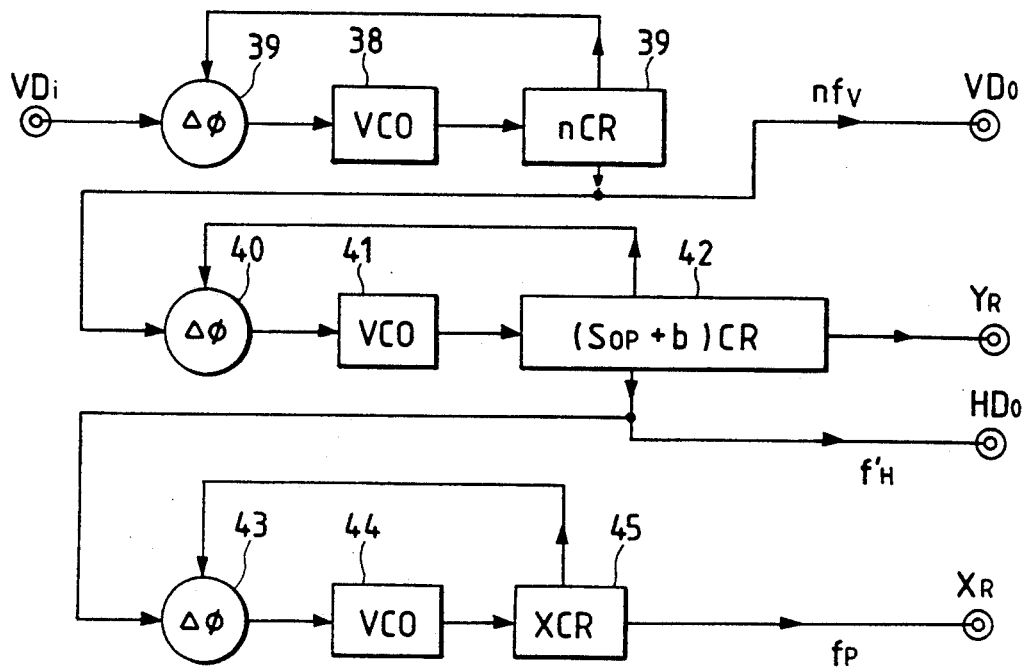
FIG. 11 is a block diagram showing elements of a further embodiment of the present invention.
Figure 12A:
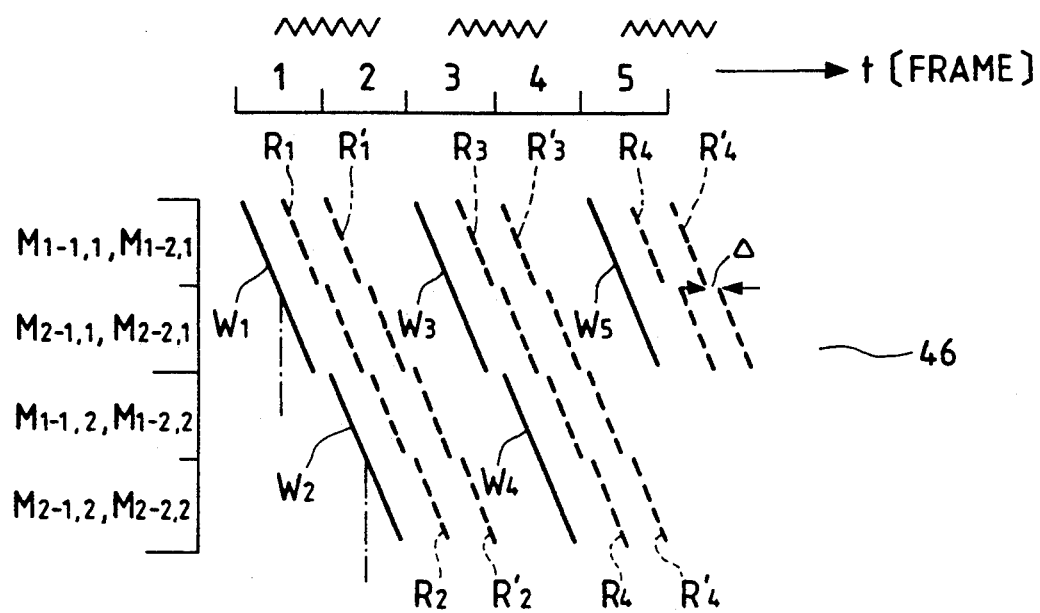
FIGS. 12A and 12B show a timing chart and moving pole image for explaining the operation of the embodiment of FIG. 11.
Figure 12B:
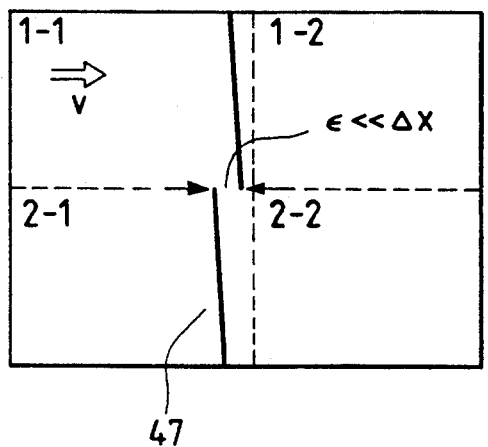

Among the above-mentioned methods, the last method can be recommended for general purpose. Then in the signal source 1 of FIG. 1, it is recommended that the domain of the effective information be previously limited. In this case, the number of scanning lines at the beginning point of the effective information is 0.5 ($S_{IB}+nb$), and the end point is $S_I - 0.5$ ($nb - S_{IB}$). Consequently, the effective part between the beginning point and the end point becomes $S_I - nb$. In the system of the present invention shown in FIG. 1, the vertical frequency is multiplied n times, but the horizontal frequency is maintained. Accordingly, the problem of excessive horizontal blanking period does not take place. FIG. 11 shows the primary portions of an embodiment which can overcome the problem of omitting the information at the vertical upper and lower ends as above described. In FIG. 11, elements 37–45 correspond to elements 7–10 and 22–25 in FIG. 1. Elements 37, 38 and 39 (39 is a programmable counter counting the number n of rows) form a PLL, and multiply the vertical frequency n times. The output vertical synchronous signal $VD_0$ is obtained at the output of the programmable counter 39 and $VD_0$ is used commonly in each line of a successive display section. A programmable counter 42 is provided for counting ($S_{OP}+b$) (equation (1)). Elements 40, 41 and 42 form another PLL, and a read-only vertical address $Y_R$ and a horizontal $HD_0$ are generated at the output of the programmable counter 42. Each of elements 38, 41 and 44 represents a (voltage controlled oscillator) VCO, and their oscillation frequencies are approximately $nf_v$, $f_H$ and $f_p$ respectively, where $f_p$ is a clock frequency for picture signals. Moreover, $f_H$ is somewhat higher than the horizontal frequency $f_H$ of the input signal. Element 45 is a programmable counter counting the number of clocks per horizontal period. Elements 37, 40 and 47 are phase detectors and elements 43, 44 and 45 form another PLL, and a read-only horizontal address $X_R$ is generated at the output of the programmable counter 45. The outputs $Y_R$ and $X_R$ are used commonly as addresses to each of the frame memories 21 in FIG. 1. Moreover, the outputs $VD_0$ and $HD_0$ are used commonly as input synchronous signals to each of successive displays. Moreover, the writing to the frame memories 21 in FIG. 1 is performed by the systems 22–25 based on equation (1) as already described. The operation principle for the embodiment shown in FIG. 11 is indicated in FIGS. 12A and 12B which represent the case of two rows and two columns and there is shown a timing chart 46 and a view 47 of the moving pole images. In the timing chart 46, the abscissa indicates time $a$ in frame unit, and the ordinate represents the co-ordinates for addresses of the frame memories. Two sets of the frame memories are used as shown in FIG. 4, for necessity of performing the writing and the reading alternately. $W_1$ indicates the timing of writing the frame 1 of input signal into the first set of the frame memory. $R_1$ and $R_{2'}$ indicate the timing of reading the signal out of the frame memory and outputting the signal to the successive display. $R_2$ and $R_{2'}$ indicate the timing of reading the signal out of the frame memory and outputting the signal to the successive display. $W_3$ indicates the timing of writing the frame 3 of input signal into the first set of the frame memory. Similar processes are hereinafter carried out. As is apparent from FIG. 12A, a small time difference $\Delta$ takes place in the boundary position of the display unit in two rows. However, since the value of $\Delta$ is in the order of the vertical flyback period of the display which is approximately 0.5 ms, it is in the order of approximately 1/30 in comparison with about 16 ms of the prior art in FIG. 5. Accordingly, the amount of discontinuity width $\epsilon$ of the moving pole image 47 is reduced to approximately 1/30 of that in the prior art. Therefore, such discontinuity can hardly be detected subjectively.

In FIG. 11, the programmable counter 42 counting $(S_{OP}+b)$ can set the value of $S_{OP}$ freely. $S_{OP}$ is the number of effective scanning lines per one row as already described. If $S_{OP}$ is chosen to 1/n of the number $S_{IP}$ of effective scanning lines of input signals, the input signals can be displayed on the whole screen without any defect for the upper/lower ends. This is the effect provided by the third embodiment of FIG. 11.

In the embodiment of FIG. 1, in order to make the output horizontal frequency coincident with the horizontal frequency of the input signal, the sum of the number $S_{OP}$ of effective lines per one row and the number b of scanning lines for a vertical blanking period of the successive display, i.e., $(S_{OP}+b)$ is required to comply with $S_I/n$. Accordingly, the number of effective scanning lines of the whole screen is limited to $nS_{OP}$, that is, $(S_I-nb)$. On the contrary, in the embodiment of FIG. 11, its output horizontal frequency can be raised by the action of the PLL 40, 41 and 42. That is, the $S_{OP}$ can be selected arbitrarily.

Figure 13:
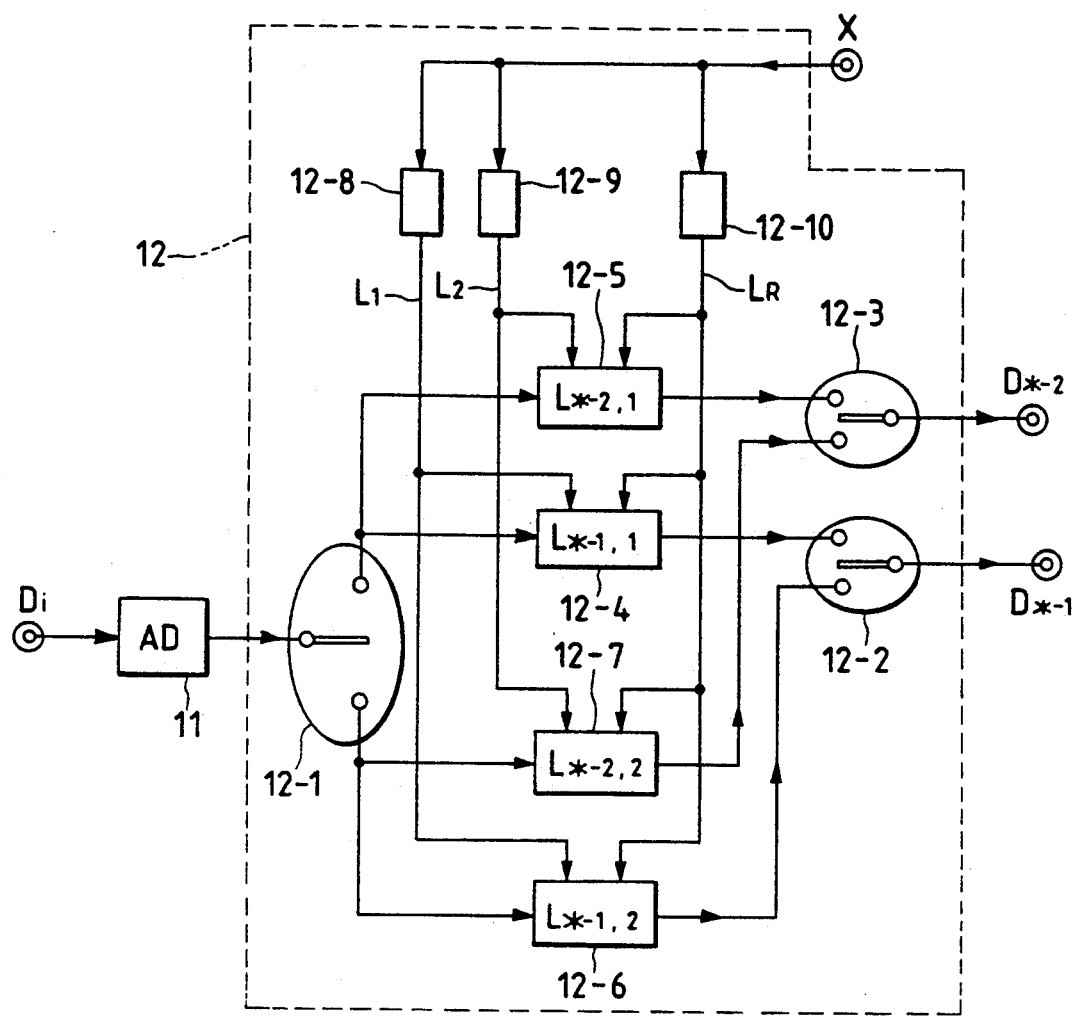
FIG. 13 is a block diagram showing the construction of an SP converter of FIG. 1.
Figure 14:
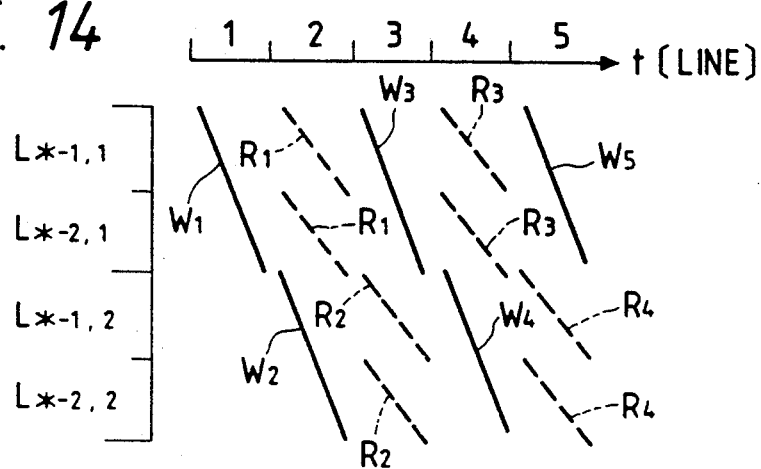
FIG. 14 is a timing chart for explaining the operation principle of the SP converter in FIG. 13.

A conventional SP converter as utilized in the prior art arrangement in FIG. 4 can be utilized in the present invention, but FIG. 13 shows a block diagram arrangement thereof for the purpose of implementation of the present invention. The portion enclosed by dotted line in FIG. 13 corresponds to the SP converter 12 of FIG. 1. Elements 12-1, 12-2 and 12-3 are switches, and elements 12-4, 12-5, 12-6 and 12-7 are line memories. Two sets of the line memories are used in each column, and the writing and the reading are carried out alternately. A write-in address generator 12-8 is provided for the first column, a write-in address generator 12-9 is provided for the second column, and there is also provided a read-out address generator 12-10. FIG. 14 shows a timing chart for explaining its operation principle. The abscissa indicates time, and its unit is one horizontal line. The ordinate indicates address positions of the line memories. $W_1$ indicates the timing of writing the line 1 of input signals into the first set of the line memory $L^*_{-1,1}$ (for the first column) and $L^*_{-2,1}$ (for the second column). $R_1$ indicates the timing of reading the signal. Similar processes are carried out hereinafter. Read-out signals, that is, $D^*_{-1}$ for the first column and $D^*_{-2}$ for the second column are transmitted to the successive frame memory 21 as already described in FIG. 1.

The address generating section of generators 12-8–12-10 in FIG. 13 will now be described quantitatively. Generally, if the write-in address number for the g-th line is made Lg, Lg is given as a function for the input horizontal address by the following equation (6).

$$Lg = x + a - A - (g-1)T_{OP} \qquad (6)$$

In equation (6), the origin for the input horizontal address number X is the beginning point for the input horizontal synchronous signal $HD_i$. The origin of the output Lg is the beginning point of address of line memories. A expresses the timing for input signals corresponding to the left end (beginning end) of the entire multi-screen by the address number. $T_{OP}$ is the number of effective indicating picture elements per one column. Accordingly, in the case of a total of n columns, $nT_{OP}$ corresponds to the number of total picture elements for the entire multi-screen; a is the number of picture elements in the horizontal blanking period of the successive display or a somewhat greater number; $(a+T_{OP})$ is the number of picture elements per a horizontal period of the display, and this is usually set to be equal to 1/n times of that of the input signal. Moreover, the value of a is usually set to be equal to A/n. The write-in address generating section of generators 12-8, 2-9 in FIG. 13 is constituted by a programmable comparator and a counter.

On the other hand, the read-out address generating section of generator 12-10 generates the read-out address $L_R$ for line memories based on the following equation (7).

$$L_R = \left[ \frac{X-A}{n} + a \right] \qquad (7)$$

In equation (7), [] is an approximate integer symbol as already described. When a equals to A/n, a 1/n counter can simply be used. Generally, it can be constituted by a programmable comparator and a counter.

Figure 15:
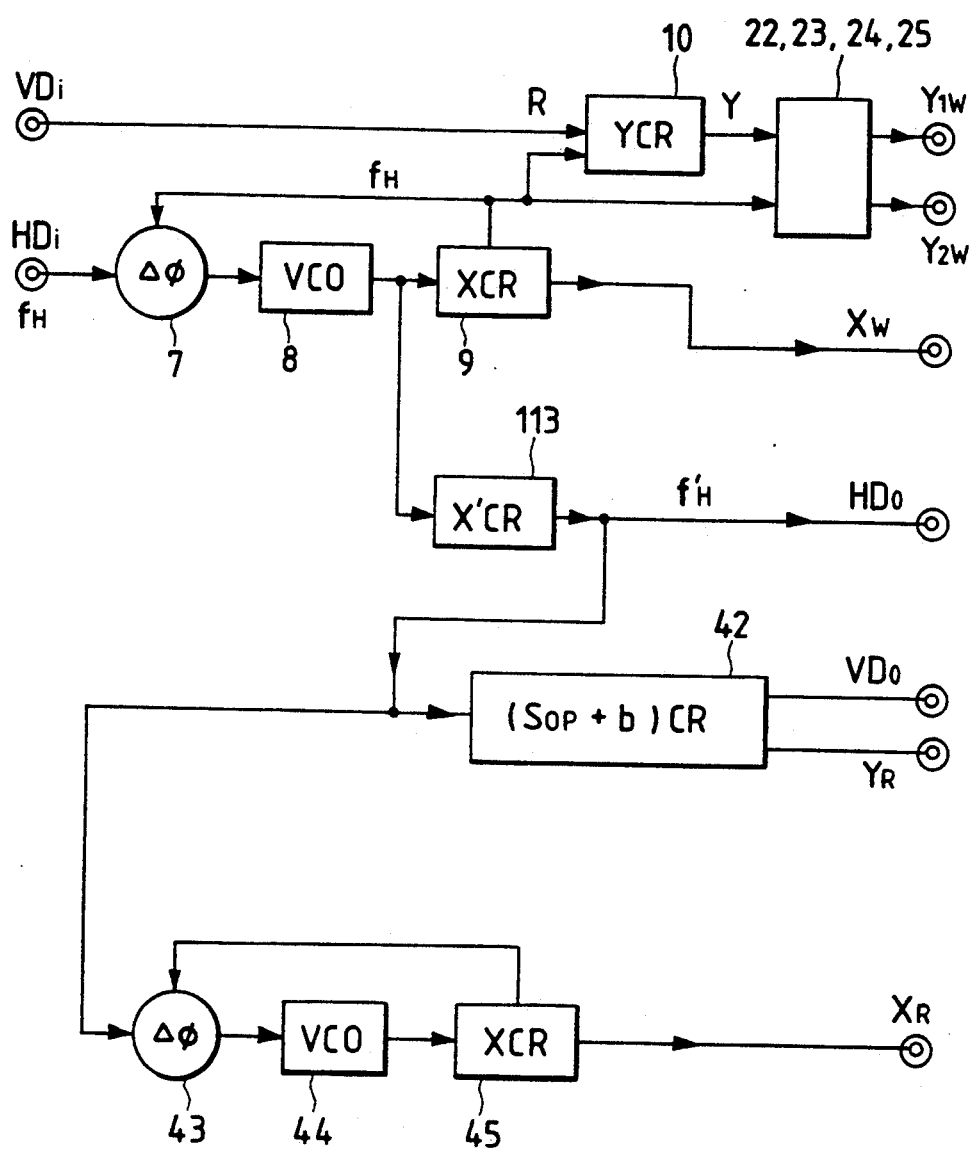
FIG. 15 is a block diagram showing elements of another embodiment of the present invention.

A modification of the embodiment of FIG. 11 is illustrated in FIG. 15 which shows only important elements. Elements 11, 12, 21 and 110 in FIG. 1 are commonly used also in this embodiment. Two sets of the frame memories 21 are used as shown in FIG. 4. In FIG. 15, elements 7, 8, 9 and 10 and elements 22, 23, 24 and 25 are the same as those in FIG. 1. Elements 42, 43, 44 and 45 are the same as those in FIG. 11. However, only the write-in address generating section corresponding to equation (1) is utilized. Accordingly, at the output of the generation section addresses $Y_{1w}$, $Y_{2w}$ exclusive for the writing are obtained, wherein the former address is for the first row, and the latter address is for the second row. A programmable counter 113 is provided for generating the output horizontal synchronous signal $HD_0$, and forms an important feature of the present invention. The count number M' of the counter 113 is set from the MPU 110 based on the following equation (8).

$$\frac{M'}{M} = \frac{f_H'}{f_H} = \frac{S_I}{n(S_{OP} + b)} \quad (8)$$

If the equality sign of equation (8) is effective, the output vertical frequency becomes just n times of the vertical frequency of the input signal, and this embodiment becomes equivalent to the third embodiment. In equation (8), M is the count number for the programmable counter 9, and this is equal to the total number of picture elements per horizontal period of the input signals (signal source). $S_I$ is the total number of scanning lines for input signals as already described; n is the number of rows; $S_{OP}+b$) is the total number of scanning lines of each successive display as already described. $S_I$ is usually less than $n(S_{OP}+b)$ as already described. Consequently, M' is less than M. Accordingly, the output horizontal synchronous signal $HD_0$ of the counter 113 in FIG. 15 occurs with a frequency higher than that of the input $H_i$. That is, its output frequency $f_H'$ is higher than frequency $f_H$ of the input.

In FIG. 15, $Y_{1w}$, $Y_{2w}$ and $X_w$ are used as a writing address to each frame memory 21 and $Y_R$ and $X_R$ are used as a reading address from each frame memory 21 in FIG. 1. $HD_0$ and $VD_0$ are used as horizontal/vertical synchronous signals to each successive display. The timing chart corresponding to FIG. 15 is nearly the same as the timing chart 46 in FIG. 12 corresponding to the embodiment of FIG. 11. In the embodiment of FIG. 15, however, the phase of the output vertical synchronous signal drifts slowly depending on the approximation error of equation (8). The collision between the writing process and the reading process due to the drift can be easily avoided in the field of so-called time base collector, based on the well-known principle as hereinafter described.

In FIG. 12, there are the first set of frame memories and the second set of frame memories as already described. A period between the completion of a writing operation into a frame memory of the first set for the first row and the completion of a writing operation into a frame memory of the second set forth the first row-(equivalent to one vertical period of input signals) permits the beginning of reading out operation in the frame memories of the first set, and prohibits the beginning of a reading out operation in the frame memories of the second set. The period is indicated by the wavy line extending in the time axis of FIG. 12. On the contrary, the residual period permits the beginning of a reading out operation in the frame memories of the second set, and prohibits the beginning of a reading out operation in the frame memories of the first set. The timing chart 46 of FIG. 12 satisfies the principle.

A collision between the writing process and the reading process in the same frame memory can be avoided based on the above principle. Therefore, in the case of a four row multi-screen construction, not only use of a four-times output vertical frequency with respect to the input frequency, but also use of a two-times output vertical frequency becomes possible. Consequently, the approximate equality sign in equation (8) need not be satisfied.

Figure 16:
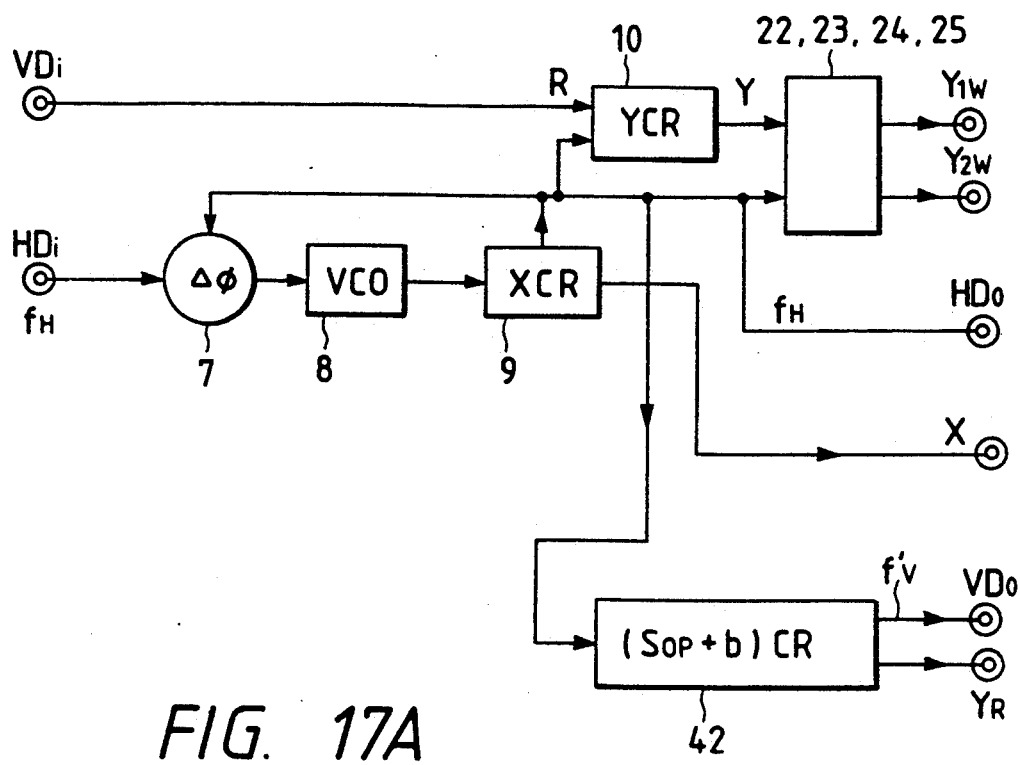
FIG. 16 is a block diagram showing elements of a further embodiment of the invention.
Figure 17A:
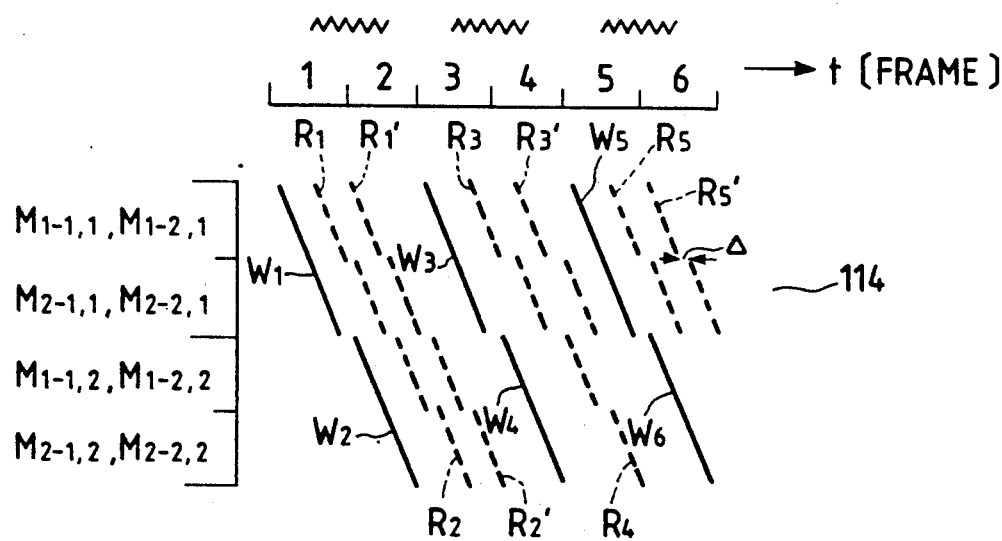
FIGS. 17A and 17B show a timing chart and moving pole image for explaining the operation principle of the embodiment of FIG. 16.
Figure 17B:
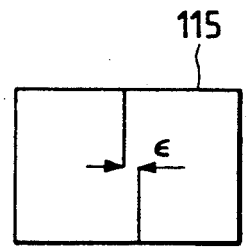

As a special case of the embodiment of FIG. 15, when the value M' is selected to be equal to the value of M, element 9 may be substituted for the programmable counters 113, 45 in FIG. 15 as represented as a further embodiment in FIG. 16. In the figure, elements 7, 8, 9, 10, 22, 23, 24 and 25 are the same as those in FIG. 15 while element 42 is the same as those in FIG. 11 and FIG. 15. The operation principle of the embodiment of FIG. 16 is shown in FIGS. 17A and 17B wherein FIG. 17A shows a timing chart 1A with the abscissa being scaled in time whose unit is a frame. The wavy line is period as already described and the axis of ordinate indicates co-ordinates for addresses of the frame memory.

As understood by comparing the view 15 of the moving pole images of FIG. 12B with FIG. 17B, the moving pole images generate no inclination distortion in FIG. 16 and FIG. 17, because the horizontal frequency $f_H$ is coincident between input and output. The width of discontinuity on the boundary between rows of the multi-screen is quite small as in the case of FIG. 12. In the timing chart 114, the reading process for $R_{4'}$ is not present because the output vertical frequency $f_{v'}$ is somewhat lower than $2f_v$. The sense of incongruity on the reproduced pictures due to this absence is extremely small, and has the order allowable adequately Because each reading cycle of $R_1$, $R_{1'}$, $R_2$, $R_{2'}$, $R_3$, $R_{3'}$, $R_4$, $R_{4'}$, $R_5$, $R_{5'}$... takes place with a constant period: $1/f_{v'}$. This embodiment has advantage that the output X of the programmable counter 9 for generating horizontal addresses of FIG. 16 can be used commonly for reading and writing.

Moreover, quantitative relationship between the input vertical frequency fv and the output vertical frequency $f_{v'}$ is indicated in equation (9).

$$\frac{f_{v'}}{f_v} = \frac{S_I}{S_{OP} + b} = \frac{S_{IP} + S_{IB}}{S_{OP} + b} \quad (9)$$

In equation (9), $S_I$ is the total number of scanning lines of input signals; $S_{OP}$ is the number of effective indication scanning lines, and b is the number of scanning lines during the vertical blanking period of displays. $S_{IP}$ is the number of scanning lines during the effective signal period in input signals, and SIB is the number of scanning lines during the blanking period in input signals.

Also in the embodiment of FIG. 16, in the writing process into the frame memory of FIG. 1, writing address $Y_k$ ($Y_{wk}$) is set based on equation (1) as already described. In this embodiment, the scanning line $S_{OP}$ per one row in equation (1) and equation (9) can be set arbitrarily by the MPU 110. Accordingly, magnification for the vertical direction on the multi-screen displays can be set freely. That is, if $S_{OP}$ is set equal to $S_{IP}$, the magnification in the vertical direction is 1, and if $S_{OP}$ is set to $S_{IP}/n$, the magnification becomes n. Moreover, the number B of scanning lines corresponding to the upper end of the screen in equation (1) is varied continuously by the MPU 110, thereby the reproduced pictures can be moved in the upper and lower directions. Also in the SP transforming section 12, if $T_{OP}$(the number of effective indicated picture elements per one column) of equation (6) is decreased continuously, and at the same time, if the value n of equation (7) is controlled by the MPU 110 so that it is equal to $T_{IP}/T_{OP}$ (where $T_{IP}$ is the number of effective indicated picture elements in the horizontal direction of input signals), the magnification for the reproduced pictures in the horizontal direction can be controlled continuously. Moreover, in equation (6), if the picture element number A corresponding to the left end of the whole screen is varied continuously by the MPU 110, the reproduced pictures can be moved continuously in the horizontal direction. Accordingly, if $S_{OP}$ (the number of scanning lines per one line) in equations (1) and (9) and $T_{OP}$ (the number of picture elements per column) and n (magnification) in equation (7) are synchronized and controlled, pictures on the screen can be enlarged or reduced with uniformity.

Figure 18:
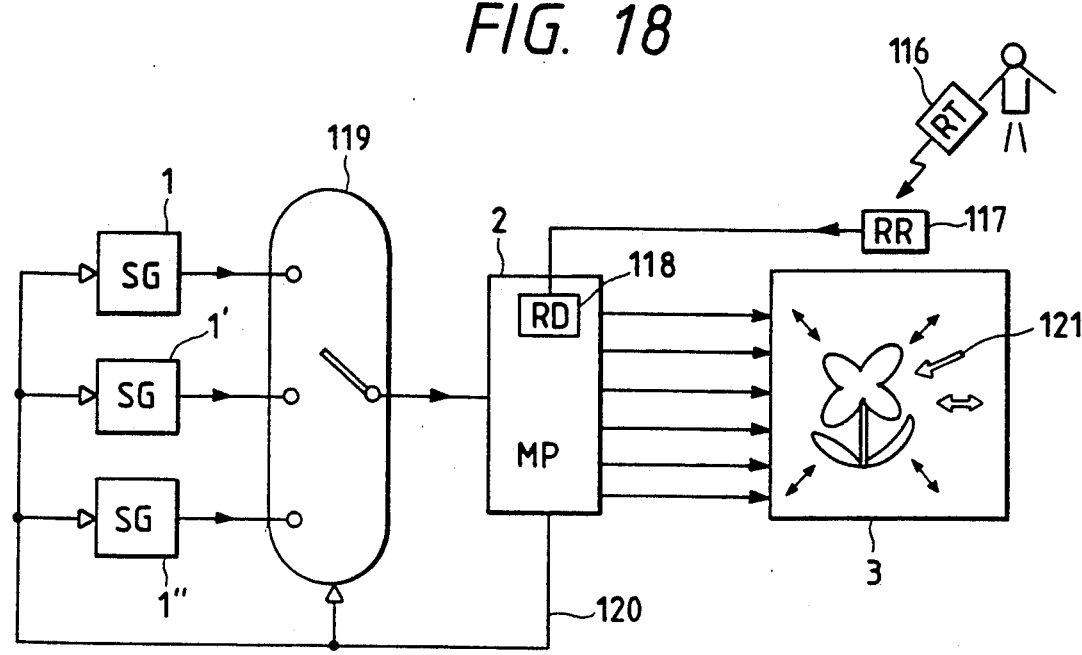
FIG. 18 is a block diagram showing another embodiment of the present invention.
Figure 19:
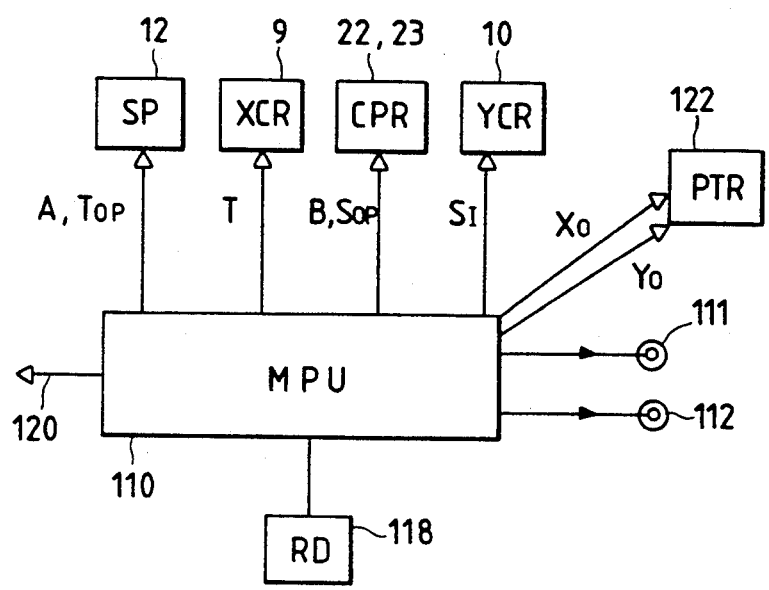
FIG. 19 is a block diagram showing elements of a microprocessor of FIG. 18.

FIG. 18 shows a multi-screen display system suitable for presentation purposes for carrying out the control and represents a modification of FIG. 2, and when considered together with FIG. 19 constitutes a further embodiment of the present invention. In the FIG. 18, elements 1, 1' and 1" are three kinds of signal sources. For example, the signal sources may be a graphic computer, a pictorial and calligraphic camera, and a video disk player. There is also a multiprocessor 2 and a multi-screen display 3. A remote control transmitter 116 of the infrared ray type, for example, is controlled by a person such as lecturer. A remote control receiver 117 is arranged above the display and a remote control decoder is included as a part of the multiprocessor 2. A switch arrangement 119 is disposed as illustrated and a bus line 120 such as an RS-232C are used.

In FIG. 19, outputs of the decoder 118 are supplied to the MPU 110. The MPU regulates values A, $T_{OP}$, B and $S_{OP}$ supplied to elements 12, 22 and 23, based on control signals starting from the transmitter 116 and passing through the receiver 117 and decoder 118. Accordingly, the movement, enlargement and reduction of the reproduced pictures are controlled. Moreover, the MPU controls selection and operation of the signal sources 1, 1' and 1" through the bus line 120, based on control signals starting from the transmitter 116 and passing through the receiver 117 and decoder 118. As the total number $S_I$ of scanning lines of the signal sources 1, 1' and 1" and the total number $T_I$ of picture elements per horizontal period are known in advance, elements 9 and 10 are supplied with the values known based on this. Simultaneously, signals for setting sizes and positions are supplied to each unit of the successive display 3 through the terminals 111 and 112 as already described in FIG. 1. In FIG. 18, there is shown a pointer mark 121 which is used for convenience of explanation by the lecturer The pointer mark 121 is generated in a pointer generating section 122 in FIG. 19 and its position $X_0$, $Y_0$ is controlled through the receiver 117, decoder 118 and MPU 110 in response to the transmitter 116.

Figure 20:
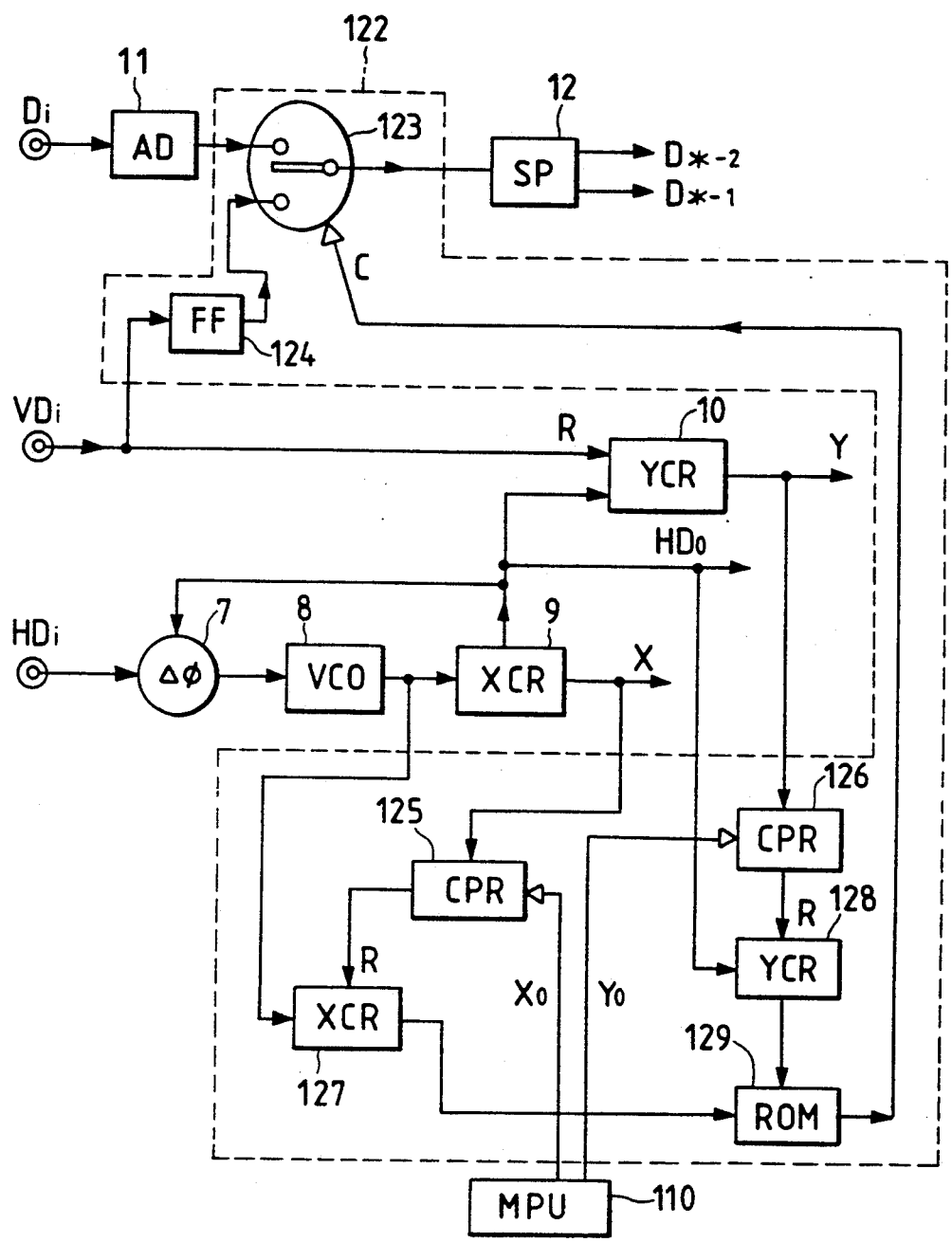
FIG. 20 is a block diagram showing elements of a flicker-type pointer section of FIG. 19.

An example of a flicker type pointer generating section 122 is shown in dotted line in FIG. 20. In FIG. 20, wherein elements 7, 8, 9, 10, 11 and 12 are the same as those in FIG. 1. Further, there is provided a switch 123, a flip-flop, whose outputs are inverted each time the input vertical synchronous pulse signal $VD_i$ is inputted, thereby providing a flicker effect. The switch 122 is connected to the side of the flip-flop only while control signal C is in the period "H", and it is connected to the side of the AD converter 11 while the control signal C is in the period "L". The control signal C is outputted from a ROM (Read Only Memory) 129 for generating pointer marks. Programmable comparators 125 and 126 are provided and co-ordinates $X_0$, $Y_0$ represent the pointer mark co-ordinates to each comparator from the MPU 110. Each comparator compares other address inputs X and Y with $X_0$ and $Y_0$, and outputs a pulse at the timing that both are coincident. Counters 127 and 128 are provided for counting picture element clocks and horizontal pulses $HD_0$ respectively. The counters 127 and 128 are reset by output pulses of the comparators 125 and 126 respectively. The counters 127 and 128 supply the ROM 129 with addresses being displaced in parallel based on $X_0$ and $Y_0$ respectively. The ROM controls the switch 123. Accordingly, the positions of the pointer marks can be controlled freely by increasing or reducing the position co-ordinates $X_0$, $Y_0$ which are originated from the transmitter 116 in FIG. 18 and transmitted through the receiver and the decoder.

Referring now to the display section, problems in the case of using CRT projection type displays in the display section will be first explained. Generally, fluorescent materials being used on the fluorescent face plates of CRT indicate saturation characteristics, when the input electron power density is large. Since the saturation characteristics deteriorate the electrooptic conversion efficiency of the fluorescent materials, this becomes a problem in the prior art.

Figure 21:
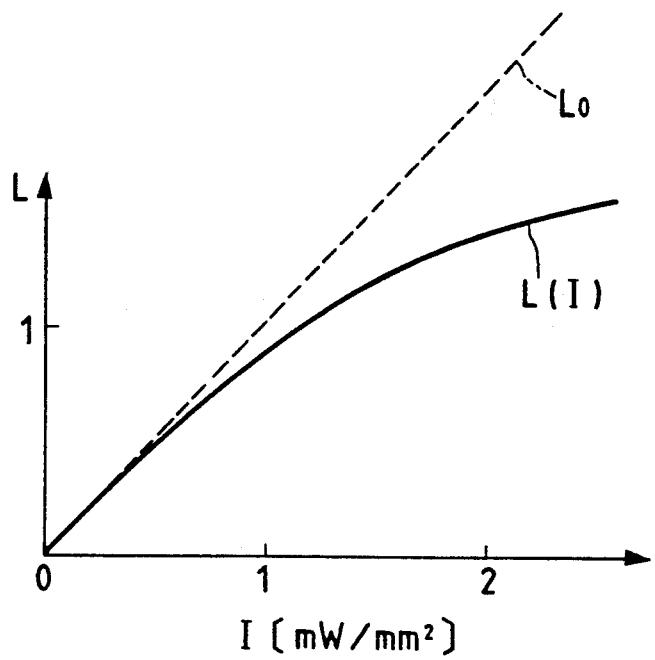
FIG. 21 is a characteristic diagram showing general saturation characteristics of fluorescent material.

FIG. 21 shows an example of the saturation characteristics of fluorescent materials wherein the abscissa represents the input electron power density I, and ordinate represents brightness. The dotted line $L_0$ indicates the ideal characteristics without saturation, and the solid line $L(I)$ indicates the actual saturation characteristics.

Figure 22:
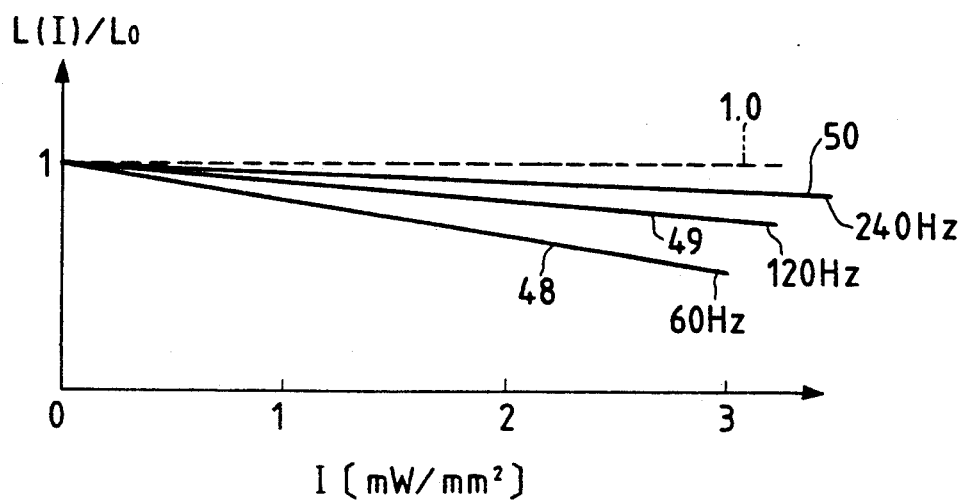
FIG. 22 is a characteristic diagram showing the general variation of saturation ratio of fluorescent material using vertical frequency as parameter.

In FIG. 22, the ratio $L(I)/L_0$, that is, the saturation ratio is indicated on the ordinate with the abscissa representing the electron power density 7. In FIG. 22, line 48 indicates the case where the vertical frequency $f_v$, is a normal value of 60 Hz, and lines 49, 50 indicate the cases of 120 Hz, 240 Hz. respectively. As understood from the figure, the higher the vertical frequency $f_V$ of the display becomes, the more the saturation can be reduced. That is, the efficiency of luminous radiation can be improved. The reason why the efficiency can be improved with increase of $f_v$ is based on the fact that the afterglow time of the fluorescent body must be selected as short as about 3 ms or less (about 1 neper attenuation point). The afterglow time 3 ms being defined as 1 neper attenuation point becomes about 14 ms in terms of 1% attenuation point. If the afterglow time is longer than the above, a trailing phenomenon for the moving pole image takes place on the face plate based on the nature of the visual sense. In order to avoid the trailing phenomenon, fluorescent material with the afterglow time about 3 ms or less is used. Therefore, if $f_V$ is increased from the normal value of 60 Hz, the efficiency can be significantly improved. Accordingly, the embodiments as already described have also the advantage of improvement of luminous efficiency for displays.

Figure 24:
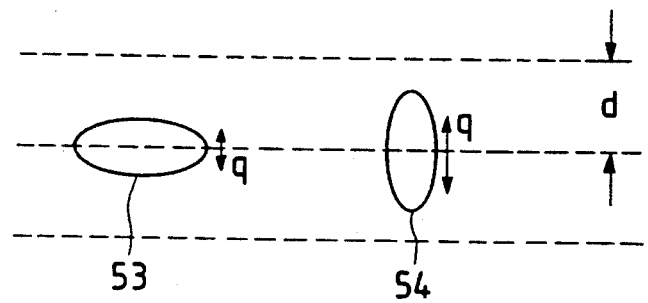
FIG. 24 is a diagram showing different spot shapes.
Figure 25:
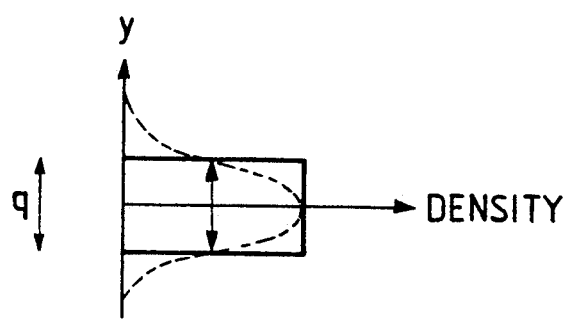
FIG. 25 is a diagram showing density distribution of a spot.

On the other hand, however, in a CRT having a small electron beam spot size, if the number $S_{OP}$ of scanning lines per one line is made too small, the scanning line density becomes rough on the face plate. As a result, the fluorescent material not contributing to radiation increases. This deteriorates the luminous efficiency. The dotted line in FIG. 25 shows a density distribution of one scanning line of the electron beam wherein FIG. 25 is a sectional view in the vertical direction (y). The rectangular solid line in FIG. 25 is drawn so that the area being enclosed between it and the y-axis becomes the same as in the case of dotted line. Its longitudinal width q is called effective longitudinal width. Two kinds of spot shapes 53, 54 of the electron beam are shown in FIG. 24 with spot 53 being a lateral spot, and spot 54 a longitudinal spot. The horizontal dotted lines in FIG. 24 represent a locus of the center of each scanning line with d being an interval between scanning lines and being in inverse proportion to the number $S_{OP}$ or scanning row. per one line.

Figure 23:
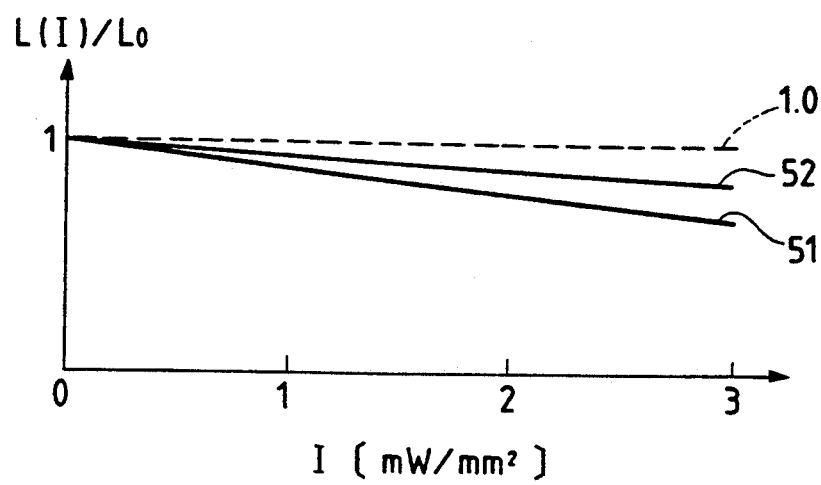
FIG. 23 is a characteristic diagram showing the general variation of saturation ratio of fluorescent material using spot shape as parameter.

FIG. 23 is a characteristic diagram indicating a relationship between spot shapes and luminous efficiency wherein line 51 corresponds to the lateral spot 53 in FIG. 24, and line 52 corresponds to the longitudinal spot in FIG. 24. Regarding the efficiency, as understood from the figure, the longitudinal spot is superior.

As mentioned above, the higher the $f_V$, the better the luminous efficiency of the fluorescent material, and further the larger the effective longitudinal width q of the spot, the better the luminous efficiency. However, even if the effective longitudinal width q is made larger than the scanning line interval d, it is not greatly effective. Contrarily, focus deterioration interference becomes remarkable. Accordingly, it is desirable that the effective longitudinal width q is substantially coincident with the scanning line interval d. On the other hand, the amount of the lateral width of the spot hardly effects the luminous efficiency. The smaller the lateral width of the spot, the better the focusing quality of the reproduced picture. Accordingly, it is desirable that the lateral width of the spot be equal to or less than the scanning line interval d.

Figure 26:
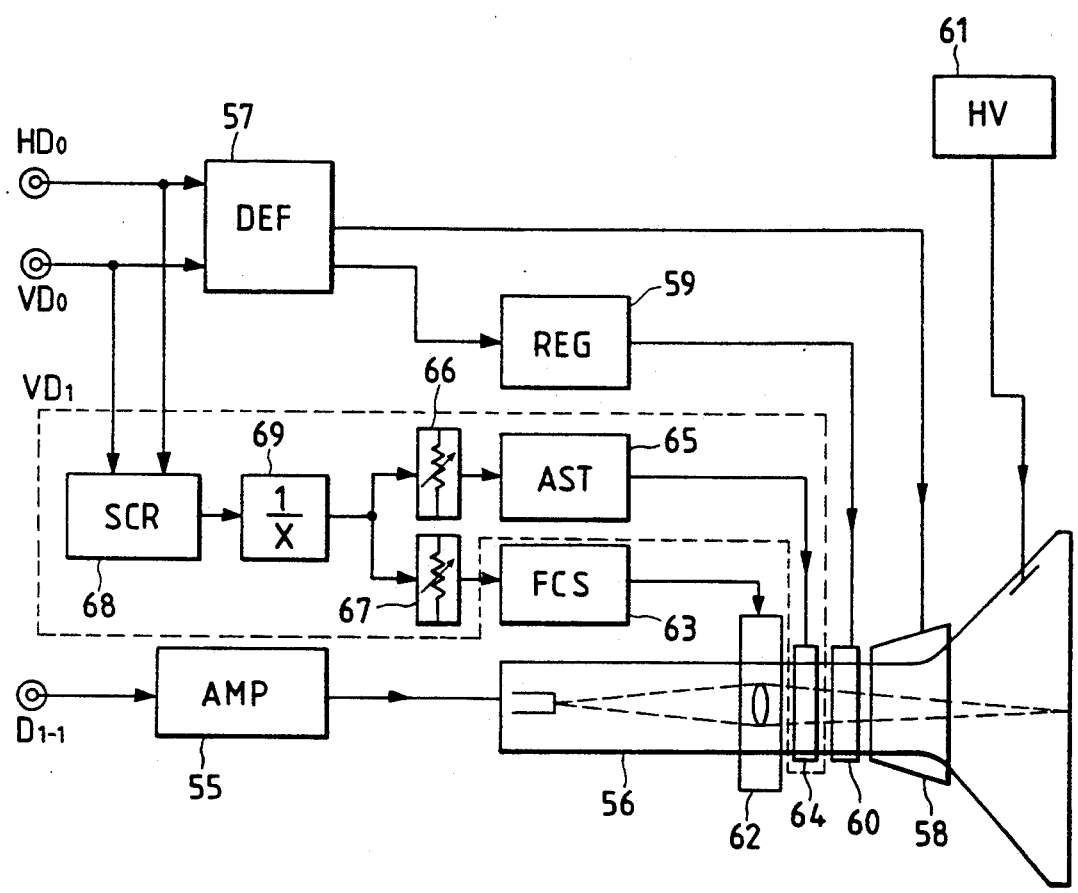
FIG. 26 is a block diagram showing another embodiment of the present invention.
Figure 27:
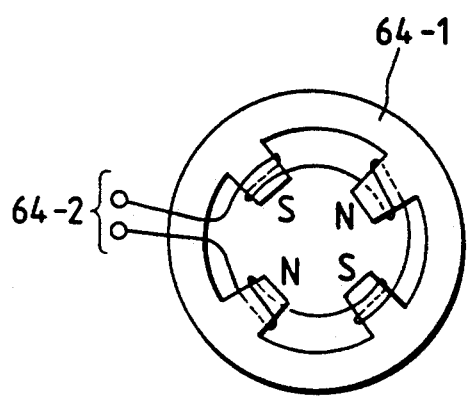
FIG. 27 is a view of an astigmatic focus yoke of FIG. 26.

An example of applying the above effect to the display section is shown in the embodiment of FIG. 26 wherein elements enclosed by dotted line represent elements in accordance with the present invention, and other elements represent conventional arrangements. FIG. 26 corresponds to one of the unit projectors and includes a video amplifier circuit 55, a CRT 56 (CRT 4 in FIG. 3) a deflection circuit 57, a deflection yoke 58, a registration circuit 59, a complementary deflection yoke 60 for registration, a high voltage circuit 61, an electromagnetic focus yoke 62, and a focus circuit 63. There is also provided an astigmatic focus yoke 64, and its detailed construction is shown in FIG. 27. FIG. 27 is a sectional view in plane perpendicular to the tube axis of the CRT 56. As shown, there is provided a core for the astigmatic yoke, and a coil 64.2 wound on the core. If the coil 64-2 is supplied with current, the magnetic filed of the four poles is generated with the polarity as shown in FIG. 27.

Figure 28:
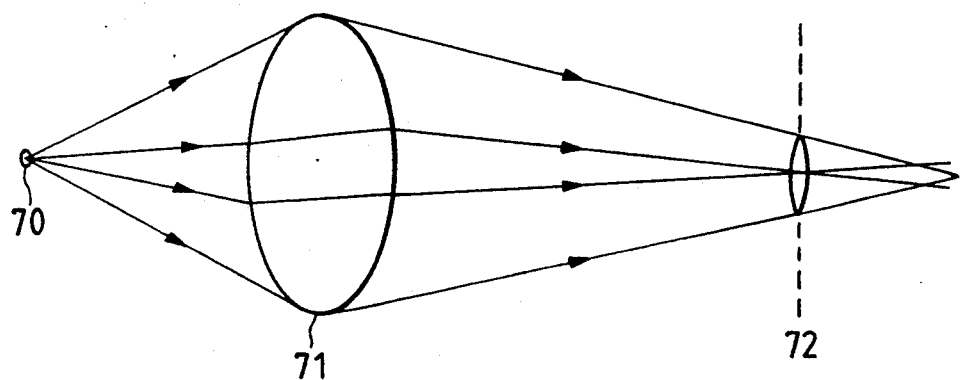
FIG. 28 is a diagram illustrating the action of a four-pole magnetic field by an astigmatic focus coil of FIG. 27.

The action of the magnetic field in the four poles is shown in FIG. 28 wherein 70 represents an electron beam source 71 is an electron lens which represents the total effect of both the converging action of the focus yoke 62 in FIG. 26 and the astigmatic action of the astigmatic yoke 64, and 72 is the position of the fluorescent surface. As indicated in FIG. 28, a longitudinal spot can be obtained on the fluorescent surface. (Further, the astigmatic focus coil 64-2 can be wound on the core in the complementary deflection yoke 60, thereby omitting the core 64-1.).

Referring again to FIG. 26, the other elements will be described and include an astigmatic circuit 65 to supply current to the coil 64-2. Potentiometers 66 and 67 are provided and a counter 68 serves for detecting the number of scanning lines per one line. A circuit 69 is provided for seeking the reciprocal number of the number of scanning lines. The functions of th counter 68 and circuit 69 may be provided by the MPU 110 in FIG. 1 as already described, and its output may be transmitted in another manner from the MPU 110 to the present display.

Figure 29:
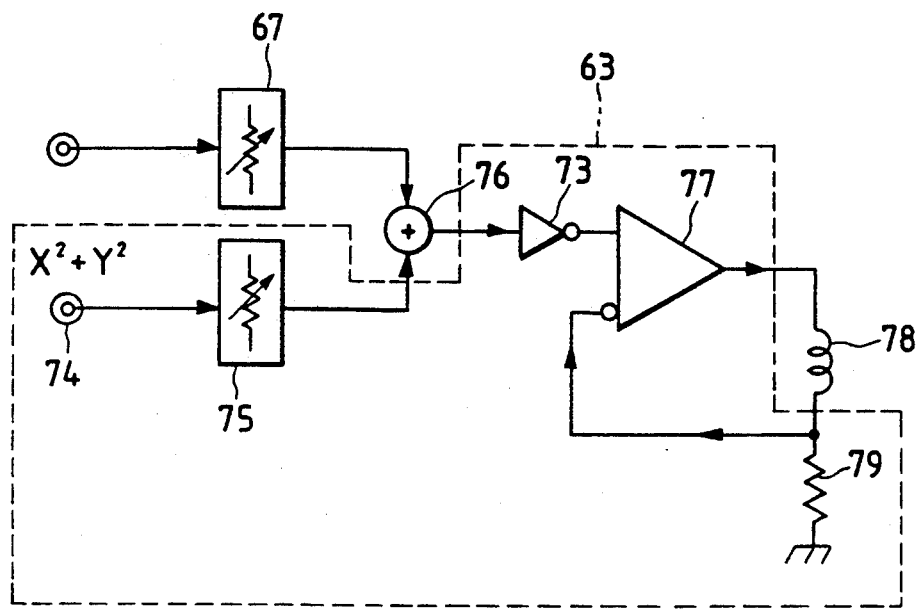
FIG. 29 is a circuit diagram of elements in the neighborhood of a focus circuit of FIG. 26.

FIG. 29 shows a circuit arrangement in the neighborhood of the focus circuit 63 wherein the dotted line box 63 in FIG. 29 represents a conventional focus circuit. A terminal 74 is provided, to which signals having a waveform constituted by addition of horizontal and vertical parabolic waveforms are inputted, in order to obtain uniform focus characteristics throughout the fluorescent face plate of the CRT. There is also provided a potentiometer 75, an adder 76, a negative feedback amplifier 77, a focus coil 78 in the focus yoke 62 of FIG. 26, and 79 is a current detecting resistor 79. Potentiometer 67 is the potentiometer 67 in FIG. 26. 76 is an adder. An inverter or polarity reversing circuit 73 is also provided. Accordingly, the coil 78 carries a current proportional to an output voltage of the polarity reversing circuit 73. If the current decreases, the converging force of the electron lens 71 in FIG. 28 becomes weak, and the electron beam is converged far from the fluorescent face plate 72. If the number of scanning lines per one line decreases, the input voltage to the potentiometers 66, 67 increases in FIG. 26 as already described. Accordingly, in FIG. 29, the output of the inverter 73 decreases, hence the current flowing into the focus coil 78 decreases, and therefore the electron beam is converged far from the fluorescent face plate. Simultaneously in FIG. 26, as the current flowing through the astigmatic circuit 65 into the astigmatic coil 64-2 in FIG. 27 increases, the longitudinal spot can be obtained on the fluorescent face plate 72 as shown in FIG. 28. The potentiometers (66, 67 in FIG. 26) are adjusted and set in advance so that the effective longitudinal width q is nearly equal to the scanning line interval d. It is noted that the astigmatic circuit 65 may be omitted. however, the control of the converging force indicated in FIG. 29 is an essential requirement.

As is well known, in a conventional display of CRT projection type, the system is adopted where CRTs exclusive for R(red), G(green) and B(blue) are used one for each color, and each projected light is superposed on the screen. In the present art, the saturation for the B fluorescent material is especially remarkable, and the saturation of the R fluorescent material is the slightest. Accordingly, for maintaining the balance of chromaticity point for white, it is practically recommended that the effective longitudinal width of the beam spot of the CRT for G is set to be nearly equal to the scanning line interval, and the effective longitudinal width of the beam spot of the CRT for B is set to be approximately two times of the scanning line interval. However, even if the effective longitudinal width of the beam spot of the CRT for B is extended as above, it is difficult to avoid the saturation of the B fluorescent material in the bright white part. Accordingly, it is recommended that the saturation characteristics of the B fluorescent material (that is, non-linearity) is controlled and compensated in the B signal amplifying video circuit and such is provided by the embodiment illustrated in FIG. 30.

Figure 30:
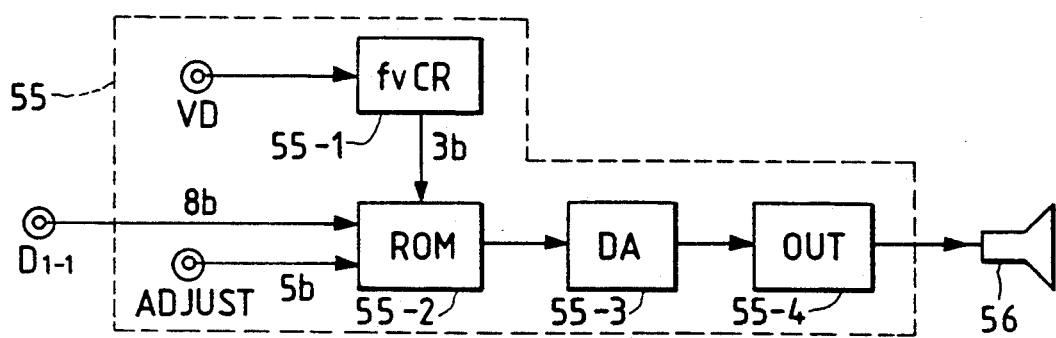
FIG. 30 is a block diagram showing an embodiment of a video amplifier circuit in accordance with the present invention.

In FIG. 30, there is shown a video circuit 55 for blue, and a CRT 56 for blue. A counter 55-1 is provided which provides the number proportional to the vertical frequency on its output, based on the input vertical synchronous signal. It is noted that 3 bits are sufficient for accuracy. A ROM (Read Only Memory) 55-2 is provided and data having 8 bits in the ROM are outputted, based on blue signal input $D_{1-1}$ of 8 bits and an input of 5 bits for gain adjustment. As the inputs to the ROM are 16 bits in total, ROMs having capacity of 64k Byte are used.

Figure 31:
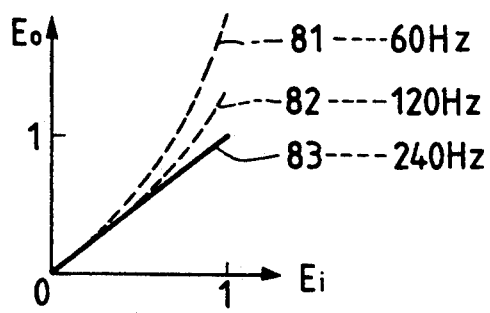
FIG. 31 is a characteristic diagram showing input/output conversion characteristics of a ROM of FIG. 30.

FIG. 31 shows an example of input/output conversion characteristics of ROMs wherein the abscissa Ei represents an input ($D_{1-1}$), and the ordinate Eo represents an output. Curves 81, 82 and 83 are obtained in accordance with vertical frequencies 60 Hz, 120 Hz and 240 Hz, respectively. Referring again to FIG. 30, there is also provided a DA converter 55-3, and a video output circuit 55-4. As already described, the lower the vertical frequency, the greater the saturation of blue fluorescent material, so the saturation is compensated by non-linear extension characteristics as indicated by curve 81, for example.

Figure 3:
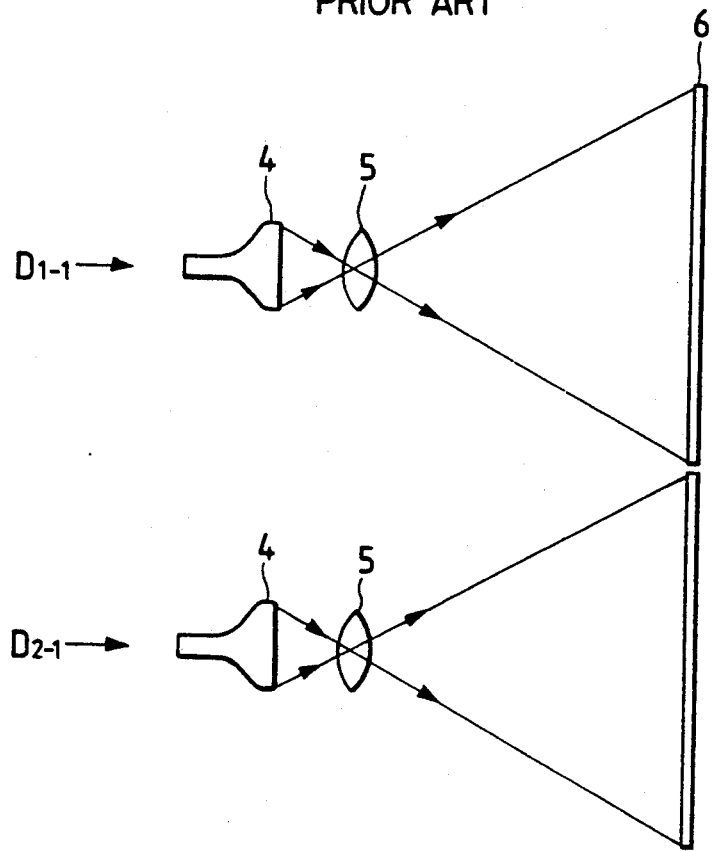
FIG. 3 shows an arrangement of display units of the multi-screen display system.
Figure 32:
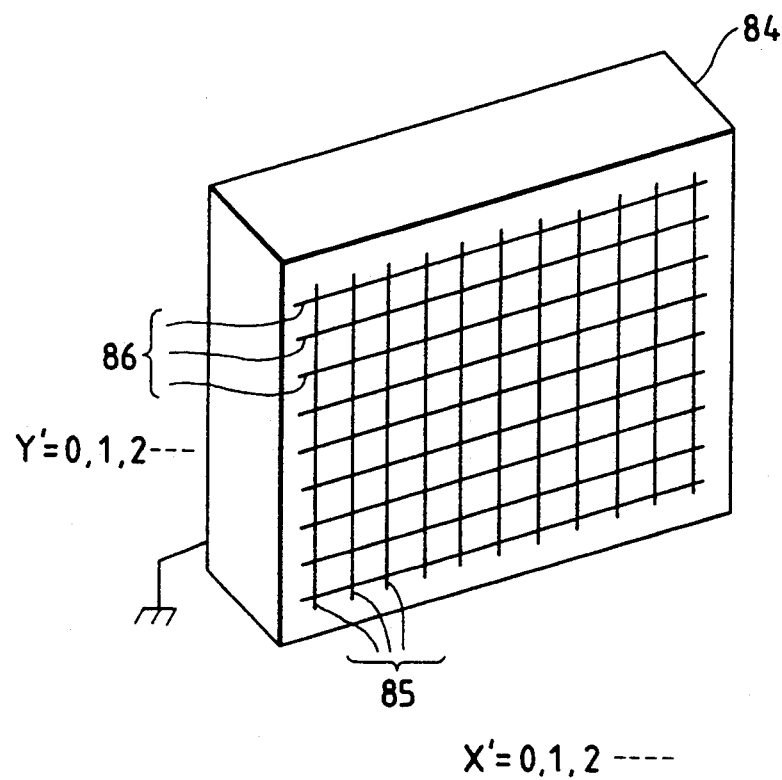
FIG. 32 is a perspective view showing a liquid crystal panel in accordance with the present invention.

Next, the case of using a liquid crystal projector for the multi-screen display 3 in FIG. 2 will be described with reference to be utilized in place of the CRT 4 in FIG. 3 and providing output light which is projected via lens 5 onto the screen 6. FIG. 32 is a perspective view of a liquid crystal panel. A TFT (Thin Film Transistor) liquid crystal panel 84 is illustrated having a wiring group 85 for setting the horizontal co-ordinates X' (numbered in order from the left) and a wiring group 86 for setting the vertical co-ordinates Y' (numbered in order from the upper side). A uniform transparent conductive film electrode is provided beyond the panel 84, and the thin film is grounded.

Figure 33:
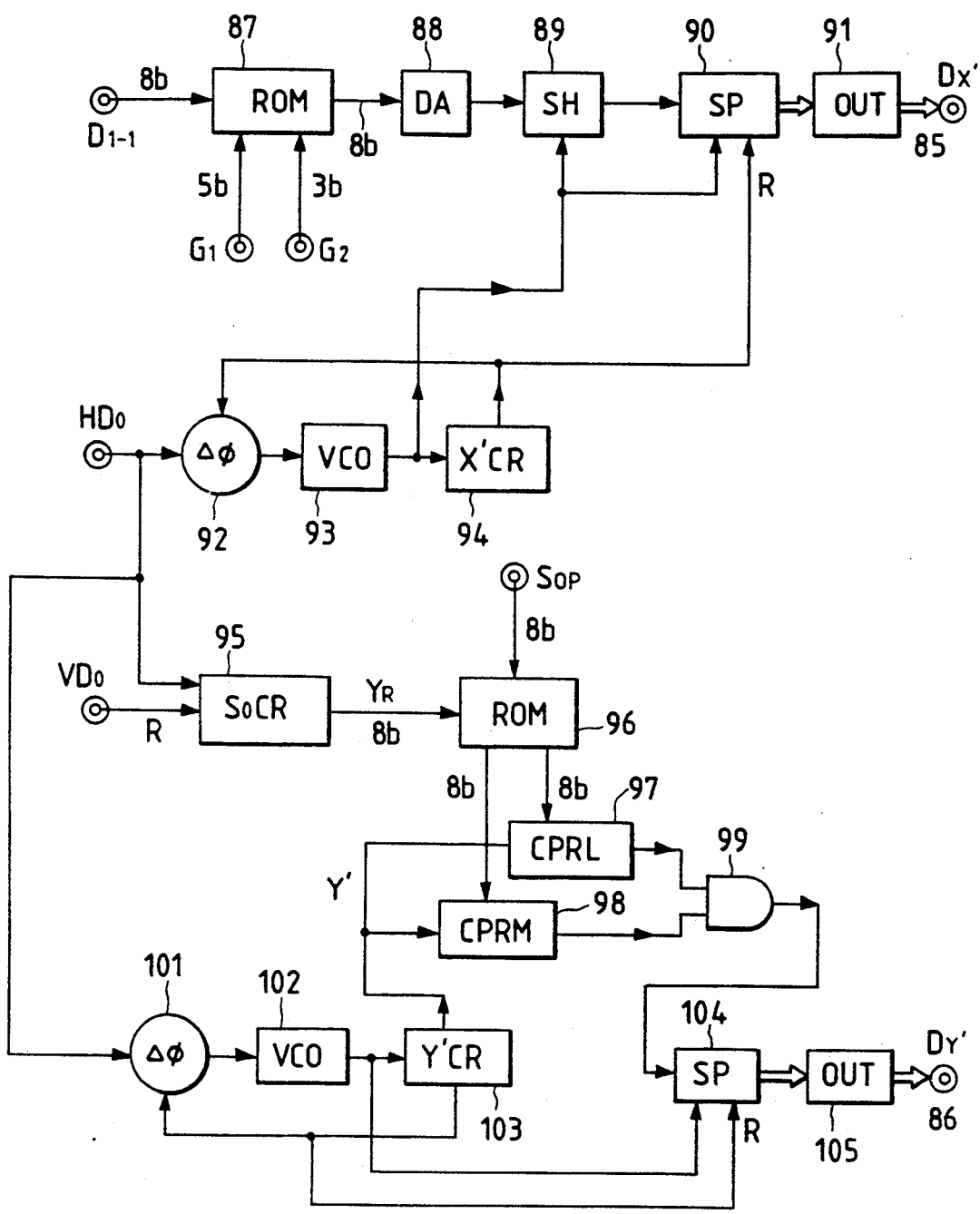
FIG. 33 is a block diagram showing another embodiment of the present invention.

Hereafter, explanation is carried out in the case that X' is 256 lines in total (numbered 0–255) (called horizontal effective address number $X_e'$) and Y' is 0–256 lines (called vertical effective address number $Y_e'$). The liquid crystal panel cannot change the number of scanning lines, as each picture element is fixed on the panel. Accordingly, special arrangements are required in order that a liquid crystal projector utilizing a liquid crystal panel is used as a display unit for multi-screens as shown in the embodiment of FIG. 33. In the figure, a ROM 87 is provided for so-called gamma correction. G1 is an input for gain of 5 bits or for bias adjustment, and G2 is an input of 3 bits for adjusting non-linearity degree. $D_{1-1}$ is a picture signal input of 8 bits to the display of the first line and the first column. The ROM 87 provides an output signal of 8 bits which is converted by a DA converter 88. A sample-and-hold circuit 89 is provided and an SP converter 90 for outputting 256 parallelized outputs, after storing 400 serial data in total, which are equivalent to those of one line, to a line buffer 91. The outputs being composed of 256 lines of the line buffer are connected to a wiring group 85 having 256 lines in FIG. 32. A voltage corresponding to each picture signal is applied to each line among 256 lines. In FIG. 33, elements 92, 93 and 94 constitute a PLL loop, based on an input horizontal synchronous signal HD. A programmable counter 94 serves for counting the total horizontal address number Xt' of the liquid crystal panel. The sample-and-hold circuit 89 and the SP converter 90 are operated by clock pulses generated from the VCO 93. Moreover, the SP converter 90 is reset by output horizontal pulses of the counter 94. A counter 95 counts the number $S_0$ of scanning lines of input signals, which is triggered by an input horizontal synchronous signal $HD_0$ and is reset by an input vertical synchronous signal $VD_0$. Its output is supplied with the number $Y_R$ of scanning lines of input signals from the multiprocessor 2 as already described. A ROM 96 has a function of converting the number $Y_R$ of scanning lines of input signals to the vertical coordinates Y' of the liquid crystal panel. Details of the above are described hereafter. Elements 101, 102 and 103 form a PLL. Its input is a vertical synchronous signal $VD_0$. The VCO 102 oscillates at a frequency equal to the horizontal frequency multiplied by the total number $Y_t$ of vertical addresses. A programmable counter 103 counts the total number $Y_t$ of vertical addresses, and an address signal Y' is provided at its output. There is also included programmable comparators 97 and 98, an AND gate 99, an SP converter 104 which is the same as SP converter 90, and an output section 105 which applies output voltage to the wiring group 86 in FIG. 32.

If numbers inputted from the ROM 96 to the comparators 97, 98 are made $L(Y_R)$, $M(Y_R)$ respectively, each comparator output becomes "H" level only when the following equations (10) and (11) are satisfied. That is, "H" level is inputted to the SP converter 104 only when both equations (10) and (11) are satisfied. Accordingly, horizontal wiring groups of the liquid crystal panel corresponding to the value Y' satisfying both equations (10) and (11) through the output circuit 105 become "H" level. That is, picture signals through the above mentioned output line buffer 91 are recorded to the picture elements on these wiring groups. $L(Y_R)$ and $M(Y_R)$ of equations (10) and (11) as already described are given in the following equations (12) and (13).

$$Y \geqq L(Y_R) \tag{10}$$

$$Y < M(Y_R) \tag{11}$$

$$L(Y_R) = \frac{S_{DP}}{S_{OP}} (Y_R - 0.5) \tag{12}$$

$$M(Y_R) = \frac{D_{DP}}{S_{OP}} (Y_R + 0.5) \tag{13}$$

In equations (12) and (13), $S_{OP}$ is the number of scanning lines per one row as already described in equation (1) and $S_{DP}$ the number of lines for the horizontal wiring groups as indicated on the liquid crystal panel. Even if the values of $S_{DP}/S_{OP}$ is not an integer, equations (10)–(13) can be applied. The number of addresses necessary to generate values of equations (12) and (13) for the ROM 96 is determined from bit numbers of $Y_R$ and $S_{OP}$. As indicated in FIG. 33, in the case of each 8 bits, the number of addresses is 16 bits in total, that is, 64K.

Previously, it has been considered difficult for the liquid crystal projector to be adapted for arbitrary signal sources in the manner of multi-scanning, as the positions of picture elements of the liquid crystal projector are fixed. However, in the embodiment of FIG. 33, adaptation for multi-scanning becomes possible by the function of the ROM 96. Also in this embodiment, distortion of the moving pole images is eliminated by the combination of use with the multiprocessor as described in the embodiments relating to FIGS. 1–3 and FIGS. 8–18, for example. Although not shown in FIG. 33, as is apparent to those skilled in the art, it is easily possible to incorporate signal interpolation in the vertical direction based upon the arrangement of FIG. 33. Moreover, although the afterglow time of a TFT liquid crystal panel is much longer than that of the fluorescent material for CRT, it has a specific quality where picture signals in the past is dissolved by the writing process of one time and can be replaced with new picture signals.

Accordingly, on the side of multiprocessor, for example, in FIG. 9A of the first embodiment, only a signal corresponding to R among R, R', R", R'" is outputted, and it is allowable to write in only a signal responsive to R, on the side of the TFT panel. That is, the vertical trace time of the unit liquid crystal panel is smaller than the vertical non-trace time of the unit liquid crystal panel. Then the reduction of consumed electric power becomes possible. When only signals corresponding to R are outputted, the multiprocessor can be composed of parts only described in FIG. 13, where line memories are used without the necessity of frame memories.

Next, the signal source section 1 in FIG. 2 will be described. Generally, the clock frequencies of picture elements generated by signal sources are given as the product of the number of pixels the frame frequency. Expensive hardware is necessary to increase the clock frequencies and the total number of pixels. If frame frequencies of the signal sources can be reduced, high precision picture can be provided within the same clock frequency. However, the reduction of frame frequencies of signal sources is not suitable, as so-called flicker interference takes place in conventional displays. When signal sources are used in combination of multiprocessors of the present invention, input frame frequencies are raised, thereby high output frame frequencies can be obtained. Accordingly, due to the present invention, large screens of a multi-screen system without flicker interference can be obtained, using the signal sources of a higher precision computer. For example, in the case of an arrangement in two rows, the vertical scanning frequency of a signal source is made 40 Hz, and is changed to approximately 80 Hz by the microprocessor. Moreover, in the case of four rows, the vertical scanning frequency is set to 20 Hz or 40 Hz, and is changed to approximately 80 Hz by a multiprocessor. That is, high precision pictures can be displayed utilizing signal sources having vertical scanning frequencies at least 2 times lower than that of the display. Although in the multi-screen display system explained as above, a multiprocessor is provided separately and independently from the multi screen display, a plurality of multiprocessors may be utilized, and may be contained within the display unit constituting the multi-screen display system.

In accordance with the present invention, a multi screen display system can be provided where inclination distortion of a moving pole image and discontinuity interference are removed. Also a multiprocessor can be realized, using a minimum number of memory elements Further, a luminous efficiency of fluorescent materials of CRTs for projection can be improved and non-linearity of fluorescent materials of CRTs for projection can be compensated with the quality of reproduced pictures being improved. Additionally, multi-scan functions in combination with a liquid crystal projector can be realized. The present invention also enables the provision of a large picture with high precision without flicker interference in combination with a signal source with low frequency and high precision. Further, a large picture on a multi-screen can be moved and enlarged and reduced freely, and a presentation system with pointer mark representation can be provided.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. Apparatus for a multi-screen projection display comprising means for processing signals from at least one signal source and for applying processed signals to at least one of a plurality of display units arranged in at least two rows so as to form the multi-screen display, the processing means including vertical scanning format transformation means for transforming a vertical scanning frequency of the output signal of the processing means to be a higher vertical scanning frequency than that of a vertical scanning frequency of the input signal of the processing means so that a ratio of the vertical scanning frequency of the output signal applied to the multi-screen display to the vertical scanning frequency of the input signal is at least two, thereby substantially eliminating discontinuity distortion of a moving pole image displayed as a reproduced picture on the multi-screen display, the vertical scanning format transformation means including at least one programmable counter for counting a sum of the number of indication scanning lines and the number of non-indication scanning lines in a unit screen of a respective display unit in accordance with horizontal pulse signals from the signal source and for enabling outputting of vertical synchronous pulse signals.

2. Apparatus according to claim 1, wherein the vertical scanning format transformation means provides a ratio of the vertical scanning frequency of the output signal to the vertical scanning frequency of the input signal which is substantially proportional to a magnification of the reproduced picture displayed on the multi-screen display with respect to a reproduced picture displayed on a respective display unit.

3. Apparatus according to claim 1, wherein the display units are arranged in n number of rows, where n is at least two, and the vertical scanning frequency of the output signal of a respective display unit is at least k times the vertical scanning frequency of the input signal from the signal source, and wherein n≠k.

4. Apparatus according to claim 1, wherein each display unit includes a cathode ray tube and a lens for projecting a reproduced image onto a screen forming the multi-screen display.

5. Apparatus according to claim 1, wherein each display unit includes a liquid crystal display.

6. Apparatus according to claim 1, wherein the processing means includes a multiprocessor which is either separate from or integral with the multi-screen display.

7. Apparatus according to claim 1, wherein a plurality of signal sources are provided, and further comprising signal source switching means for selecting a respective one of the plurality of signal sources and for outputting a signal from the selected one of the plurality of signal sources to the processing means, pointer marker generating means for generating pointer markers to be displayed on the multi-screen display, and remote control means for transmitting control signals for controlling the signal source switching means, the pointer marker generating means and a number of indication scanning lines in a unit screen of a display unit.

8. Apparatus according to claim 1, wherein the number of rows is two, and the processing means includes frame memories, a required capacity for the frame memories being one set of frame memories.

9. Apparatus according to claim 1, wherein the number of rows is more than two, and the processing means includes frame memories, a required capacity for the frame memories being two sets of frame memories.

10. Apparatus according to claim 1, further comprising at least control means for controlling a focusing force of an electron lens for focusing an electron beam of the display unit and for controlling a size of a spot of the electron beam of the display unit at least in a vertical direction.

11. Apparatus according to claim 10, further comprising non-linear extending processing means for transforming input picture signals relating to a blue color and for outputting transformed picture signals relating to the blue color, the non-linear extending processing means varying non-linearity of input/output transformation characteristics of the picture signals and compensating saturation characteristics of a fluorescent body of a cathode ray tube for the blue color.

12. A display comprising means for processing signals from at least one signal source and for applying processed signals to the display, the processing means including vertical scanning format transformation means for transforming a vertical scanning frequency of the output signal of the processing means to be a higher vertical scanning frequency than that of the input signal of the processing means so that a ratio of the vertical scanning frequency of the output signal applied to the display to the vertical scanning frequency of the input signal is at least two, thereby substantially eliminating flicker interference, the vertical scanning format transformation means including at least one programmable counter for counting a sum of the number of indication scanning lines and the number of non-indication scanning lines in a display unit of the display in accordance with horizontal pulse signals and for enabling outputting of vertical synchronous pulse signals.

13. Apparatus according to claim 12, further comprising at least control means for controlling a focusing force of an electron lens for focusing an electron beam of the display unit and for controlling a size of a spot of the electron beam of the display unit at least in a vertical direction.

14. Apparatus according to claim 13, further comprising non-linear extending processing means for transforming input picture signals relating to a blue color and for outputting transformed picture signals relating to the blue color, the non-linear extending processing means varying non-linearity of input/output transformation characteristics of the picture signals and compensating saturation characteristics of a fluorescent body of a cathode ray tube for the blue color.

15. A liquid crystal multi-screen projection display comprising means for processing signals from at least one signal source and for applying processed signals to at least one of a plurality of display units arranged in at least two rows so as to form the multi-screen display, the processing means including vertical scanning format transformation means for transforming a vertical scanning period of the output signal of the processing means to be a smaller period than that of the input signal of the processing means so that a ratio of the vertical scanning period of the output signal applied to the multi-screen display to the vertical scanning period of the input signal is no greater than 0.5, thereby substantially eliminating discontinuity of a moving pole image displayed on the multi-screen display, the vertical scanning format transformation means including at least one programmable counter for counting a sum of the number of indication scanning lines and the number of non-indication scanning lines in a unit screen of a respective display unit in accordance with horizontal pulse signals and for enabling outputting of vertical synchronous pulse signals.

16. A liquid crystal multi-screen projection display according to claim 15, further comprising horizontal scanning format transformation means including line memory means and line memory control means, the line memory control means generating a line-memory-readout clock pulse having a frequency higher than that of a line-memory-write-in clock pulse.

* * * * *